US012682809B2

(12) United States Patent
Kim et al.

(10) Patent No.: US 12,682,809 B2
(45) Date of Patent: Jul. 14, 2026

(54) TIMING CONTROLLER AND DISPLAY DEVICE INCLUDING THE SAME

(71) Applicant: Samsung Display Co., Ltd., Yongin-si (KR)

(72) Inventors: Hongsoo Kim, Yongin-si (KR); Eui-Myeong Cho, Yongin-si (KR); Yu-Chol Kim, Yongin-si (KR); Sehyuk Park, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/931,567

(22) Filed: Oct. 30, 2024

(65) Prior Publication Data

US 2025/0279023 A1 Sep. 4, 2025

(30) Foreign Application Priority Data

Feb. 29, 2024 (KR) ........................ 10-2024-0029932

(51) Int. Cl.
*G09G 3/20* (2006.01)
*G09G 3/32* (2016.01)

(52) U.S. Cl.
CPC ......... *G09G 3/2029* (2013.01); *G09G 3/2014* (2013.01); *G09G 3/2077* (2013.01);
(Continued)

(58) Field of Classification Search
CPC ..... G09G 3/2007; G09G 3/2014–2029; G09G 3/2077; G09G 3/32–3291; G09G 2300/0809; G09G 2300/0819; G09G 2300/0842; G09G 2300/0852; G09G 2300/0866; G09G 2310/0243; G09G 2310/0267; G09G 2310/06;
(Continued)

(56) References Cited

U.S. PATENT DOCUMENTS

| | | | | |
|---|---|---|---|---|
| 8,766,903 | B2 | 7/2014 | Seo et al. | |
| 2009/0243982 | A1* | 10/2009 | Lee | G09G 3/3406 345/88 |

(Continued)

FOREIGN PATENT DOCUMENTS

| | | | |
|---|---|---|---|
| KR | 101494212 | B1 | 2/2015 |
| KR | 1020200076810 | A | 6/2020 |

(Continued)

*Primary Examiner* — Nathan Danielsen
(74) *Attorney, Agent, or Firm* — CANTOR COLBURN LLP

(57) ABSTRACT

A display device includes a display panel including a plurality of pixels in a display region defined therein to emit light based on an emission signal, and a timing controller to receive an image signal and drive the display panel. The timing controller includes a gray level setting circuit which calculates a plurality of representative gray levels by dividing the display region into a plurality of regions, based on the image signal, a signal determining circuit which receives a plurality of lookup tables storing a duty ratio of the emission signal and select one of the plurality of lookup tables, based on the plurality of lookup tables and the plurality of representative gray levels, and a correcting circuit which controls the duty ratio of the emission signal provided during a frame, based on the one of the plurality of lookup tables.

20 Claims, 18 Drawing Sheets

(52) U.S. Cl.
CPC ....... *G09G 3/32* (2013.01); *G09G 2300/0819* (2013.01); *G09G 2300/0866* (2013.01); *G09G 2310/08* (2013.01); *G09G 2320/0276* (2013.01); *G09G 2360/16* (2013.01)

(58) Field of Classification Search
CPC ....... G09G 2310/08; G09G 2320/0233; G09G 2320/0242; G09G 2320/0247; G09G 2320/0257; G09G 2320/0266–0276; G09G 2320/04; G09G 2320/048; G09G 2320/0626; G09G 2320/064; G09G 2320/0673; G09G 2320/0686; G09G 2320/0693; G09G 2360/16
See application file for complete search history.

(56) References Cited

U.S. PATENT DOCUMENTS

| | | | | |
|---|---|---|---|---|
| 2022/0051620 | A1* | 2/2022 | Song | G09G 3/3233 |
| 2022/0199043 | A1* | 6/2022 | Wu | G09G 3/2007 |
| 2022/0343826 | A1 | 10/2022 | Lee et al. | |
| 2023/0410741 | A1 | 12/2023 | Lee et al. | |
| 2024/0087509 | A1* | 3/2024 | Zhai | G09G 3/32 |

FOREIGN PATENT DOCUMENTS

| | | | |
|---|---|---|---|
| KR | 1020220021059 | A | 2/2022 |
| KR | 1020230171057 | A | 12/2023 |

* cited by examiner

TIMING CONTROLLER AND DISPLAY DEVICE INCLUDING THE SAME

This application claims priority to Korean Patent Application No. 10-2024-0029932, filed on Feb. 29, 2024, and all the benefits accruing therefrom under 35 U.S.C. § 119, the content of which in its entirety is herein incorporated by reference.

BACKGROUND

(1) Field

Embodiments of the disclosure described herein relate to a timing controller improved in display quality and a display device including the timing controller.

(2) Description of the Related Art

An electronic device, such as a smart phone, a digital camera, a notebook computer, a navigation system, a monitor, and a smart television, that provide an image to a user may include a display device to display the image. The display device generates an image and provides the generated image to the user through a display screen.

A display device typically includes a plurality of pixels and driving circuits (e.g., a scan driving circuit, a data driving circuit, or an emission driving circuit) to control the plurality of pixels. Each of the plurality of pixels may include a display element and a pixel circuit to control the display element. The driving circuit for the pixel may include a plurality of transistors systematically connected to one another.

The display device may operate at various driving frequencies to improve image quality.

SUMMARY

Embodiments of the disclosure described herein provide a timing controller improved in display quality and a display device including the timing controller.

According to an embodiment, a display device includes a display panel driven in units of frames and including a plurality of pixels in a display region defined therein, where the plurality of pixels emits light based on an emission signal, and a timing controller which receives an image signal and drive the display panel, where the timing controller include a gray level setting circuit which calculates a plurality of representative gray levels by dividing the display region into a plurality of regions, based on the image signal, a signal determining circuit which receives a plurality of lookup tables storing a duty ratio of the emission signal and select one of the plurality of lookup tables, based on the plurality of lookup tables and the plurality of representative gray levels, and a correcting circuit which controls the duty ratio of the emission signal provided during a frame, based on the one of the plurality of lookup tables.

In an embodiment, the frame may include a first period and a second period subsequent to the first period, and a first pulse width of the emission signal during the first period may be different from a second pulse width of the emission signal during the second period.

In an embodiment, the gray level setting circuit may generate a gray level signal through gamma conversion on the image signal.

In an embodiment, the gray level setting circuit may calculate the plurality of representative gray levels by averaging the gray level signal with respect to the plurality of regions.

In an embodiment, the signal determining circuit may calculate a first histogram obtained by counting and classifying the plurality of representative gray levels depending on a grayscale range.

In an embodiment, the signal determining circuit may receive a plurality of gray level weights varying depending on the grayscale range and may further calculate a second histogram based on the gray level weights and the first histogram.

In an embodiment, the one of the plurality of lookup tables may be a lookup table, which has a maximum value, among the plurality of lookup tables, based on a result obtained by performing a computation operation with respect to the second histogram and each of the plurality of lookup tables.

In an embodiment, the timing controller may drive one of the units of the frames of the display panel at a first driving frequency, and drive another of the units of the frames of the display panel at a second driving frequency different from the first driving frequency.

In an embodiment, each of the plurality of pixels may include a light emitting element and a pixel driving circuit connected to the light emitting element, and the pixel driving circuit may include a first transistor, a second transistor connected to receive a data signal, and a third transistor electrically connected to the first transistor and including a gate electrode connected to receive the emission signal.

In an embodiment, the pixel driving circuit further may include a fourth transistor including a gate electrode connected to receive a first scan signal, and the timing controller may adjust the first scan signal based on the plurality of lookup tables.

In an embodiment, the frame may include a first period and a second period subsequent to the first period, and a first pulse width of the first scan signal during the first period may be different from a second pulse width of the first scan signal during the second period.

In an embodiment, the pixel driving circuit may further include a fifth transistor including a gate electrode connected to receive a bias voltage, and the timing controller may adjust a waveform of the bias voltage based on the plurality of lookup tables.

In an embodiment, the frame may include a first period and a second period subsequent to the first period, and a voltage level of the bias voltage during the first period may be different from a voltage level of the bias voltage during the second period.

According to an embodiment, a timing controller for driving a display panel in units of frames, where the display panel receives an image signal, and includes a pixel in a display region defined therein to receive an emission signal, includes a gray level setting circuit which calculates a plurality of representative gray levels by dividing the display region into a plurality of regions, a signal determining circuit which receives a plurality of lookup tables storing a duty ratio of the emission signal and selects one of the plurality of lookup tables, based on the plurality of lookup tables and the plurality of representative gray levels, and a correcting circuit which controls the duty ratio of the emission signal, based on the one of the plurality of lookup tables.

In an embodiment, the gray level setting circuit may generate a gray level signal by performing gamma conversion in the image signal.

In an embodiment, the gray level setting circuit may calculate the plurality of representative gray levels by averaging the gray level signal with respect to the plurality of regions.

In an embodiment, the signal determining circuit may calculate a first histogram obtained by counting the plurality of regions depending on a grayscale range, based on the plurality of representative gray levels.

In an embodiment, the signal determining circuit may receive a plurality of gray level weights varying depending on the grayscale range and may further calculate a second histogram based on the gray level weights and the first histogram.

In an embodiment, the one of the plurality of lookup tables may be a lookup table which has a maximum value among values obtained by performing a computation operation with respect to the second histogram and each of the plurality of lookup tables.

In an embodiment, one of the units of the frames may be driven at a first driving frequency, and another of the units of the frames may be driven at a second driving frequency different from the first driving frequency.

BRIEF DESCRIPTION OF THE DRAWINGS

The above and other features of embodiments of the disclosure will become apparent by describing in detail embodiments thereof with reference to the accompanying drawings.

DETAILED DESCRIPTION

Figure 1:
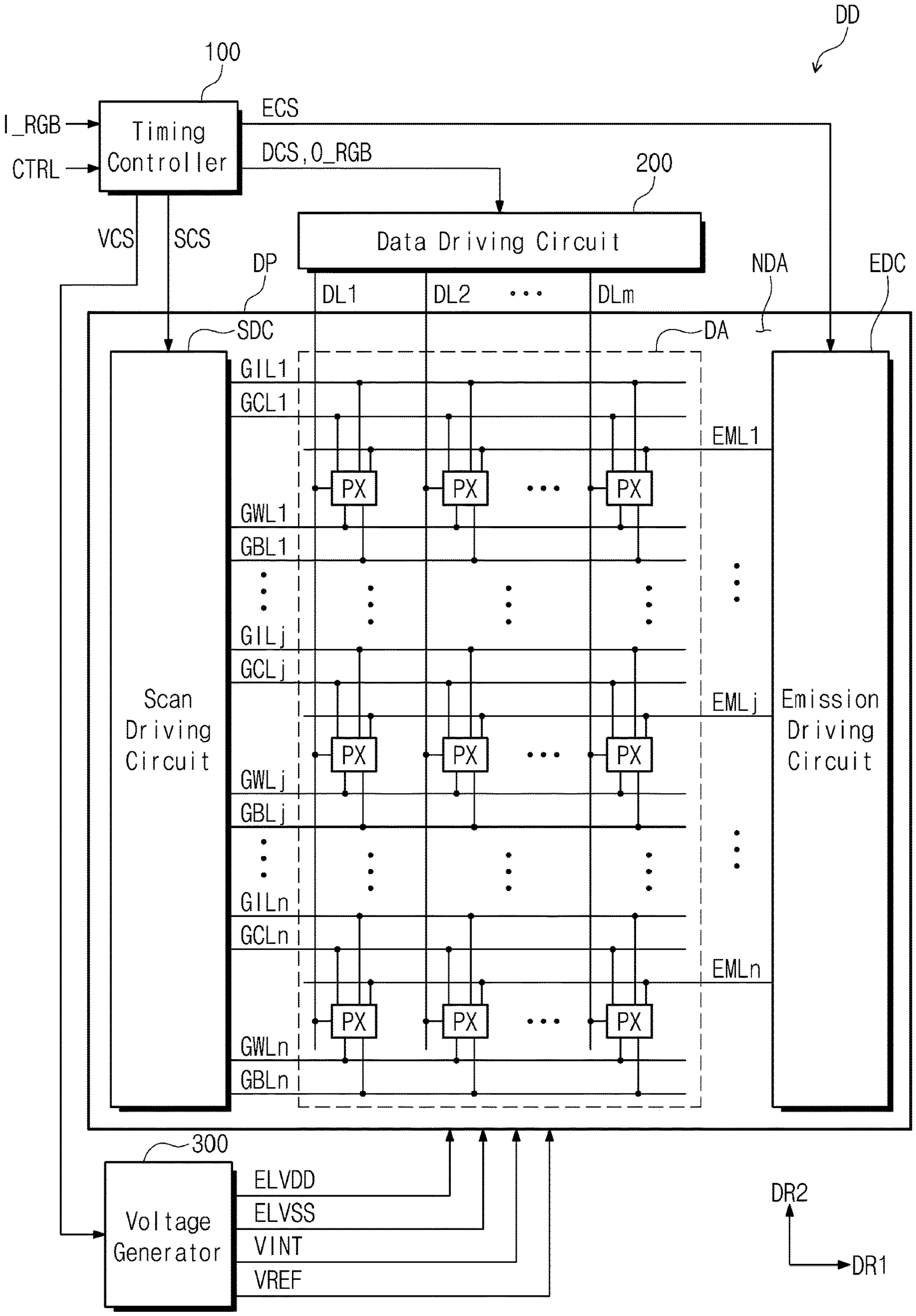
FIG. 1 is a block diagram of a display device according to an embodiment of the disclosure.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

It will be understood that when an element is referred to as being "on" another element, it can be directly on the other element or intervening elements may be present therebetween. In contrast, when an element is referred to as being "directly on" another element, there are no intervening elements present. In the specification, the expression that a first component (or region, layer, part, portion, etc.) is "connected to", or "coupled to" a second component means that the first component is directly on, connected to, or coupled to the second component or means that a third component is interposed therebetween.

The same reference numeral will be assigned to the same component. In addition, in drawings, thicknesses, proportions, and dimensions of components may be exaggerated to describe the technical features effectively.

Although the terms "first", "second", etc. may be used to describe various components, the components should not be construed as being limited by the terms. The terms are only used to distinguish one component from another component. For example, without departing from the scope and spirit of the invention, a first component may be referred to as a second component, and similarly, the second component may be referred to as the first component.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. Thus, reference to "an" element in a claim followed by reference to "the" element is inclusive of one element and a plurality of the elements. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items.

In addition, the terms "under", "at a lower portion", "above", "an upper portion" are used to describe the relationship between components illustrated in drawings. The terms are relative and are described with reference to a direction indicated in the drawing.

It will be further understood that the terms "comprises," "comprising," "includes," or "including," or "having" specify the presence of stated features, numbers, steps, operations, components, parts, or the combination thereof, but do not preclude the presence or addition of one or more other features, numbers, steps, operations, components, components, and/or the combination thereof.

Unless otherwise defined, all terms (including technical terms and scientific terms) used in the specification have the same meaning as commonly understood by one skilled in the art to which the disclosure belongs. Furthermore, terms such as terms defined in the dictionaries commonly used should be interpreted as having a meaning consistent with the meaning in the context of the related technology, and should not be interpreted in ideal or overly formal meanings unless explicitly defined herein.

Hereinafter, embodiments of the disclosure will be described with reference to the accompanying drawings.

FIG. 1 is a block diagram of a display device according to an embodiment of the disclosure.

Referring to FIG. 1, an embodiment of a display device DD may include a display panel DP, a timing controller 100, a data driving circuit 200, and a voltage generator 300.

The timing controller 100 receives an input image signal I_RGB and a control signal CTRL. The input image signal I_RGB and the control signal CTRL may be provided from an external processor (e.g., an application processor, a graphic processor, or a main processor).

The timing controller 100 may generate a flicker control signal CS (see FIG. 4) based on the input image signal I_RGB. The flicker control signal CS (see FIG. 4) may control a scan control signal SCS, a data control signal DCS, an emission control signal ECS, and a voltage control signal VCS. The details thereof will be described with reference to FIG. 4.

The timing controller 100 may output the data control signal DCS, the emission control signal ECS, the voltage control signal VCS, the scan control signal SCS, and an output image signal O_RGB.

The timing controller 100 according to an embodiment of the disclosure may determine a driving frequency based on the control signal CTRL and output the scan control signal SCS, the data control signal DCS, the voltage control signal VCS, the output image signal O_RGB, and the emission control signal ECS, which are corresponding to the determined driving frequency.

The data driving circuit 200 may receive the data control signal DCS and the output image signal O_RGB, from the timing controller 100. The data driving circuit 200 may convert the output image signal O_RGB into data signals and output the data signals to a plurality of data lines DL1 to DLm, which will be described later. The data signals may be analog voltages corresponding to the gray level of the output image signal O_RGB.

The voltage generator 300 may receive the voltage control signal VCS from the timing controller 100. The voltage generator 300 may generate voltages for operations of the display panel DP. According to the embodiment, the voltage generator 300 may generate a first driving voltage ELVDD, a second driving voltage ELVSS, a reference voltage VREF, and an initialization voltage VINT.

The display panel DP may include first scan lines GIL1 to GILn, second scan lines GCL1 to GCLn, third scan lines GWL1 to GWLn, fourth scan lines GBL1 to GBLn, emission control lines EML1 to EMLn, the data lines DL1 to DLm, and a plurality of pixels PX. The display panel DP may further include a scan driving circuit SDC and an emission driving circuit EDC.

According to an embodiment, the plurality of pixels PX may be arranged in a display region DA, and the scan driving circuit SDC and the emission driving circuit EDC may be arranged in a non-display region NDA.

According to an embodiment, the scan driving circuit SDC may be arranged at a first side of the display panel DP. The first to fourth scan lines GIL1 to GILn, GCL1 to GCLn, GWL1 to GWLn and GBL1 to GBLn may extend in a first direction DR1 from the scan driving circuit SDC.

The emission driving circuit EDC may be disposed at a second side of the display panel DP. Here, the second side may be a side opposite to the first side in the first direction DR1. The emission control lines EML1 to EMLn extend in a direction opposite to the first direction DR1 from the emission driving circuit EDC. The emission driving circuit EDC may output emission control signals to emission control lines EML1 to EMLn, in response to the emission control signal ECS.

The first to fourth scan lines GIL1 to GILn, GCL1 to GCLn, GWL1 to GWLn, and GBL1 to GBLn and the emission control lines EML1 to EMLn may be arranged to be spaced apart from each other in a second direction DR2. The data lines DL1 to DLm extend in a direction opposite to the second direction DR2 from the data driving circuit 200 and may be arranged to be spaced apart from each other in the first direction DR1.

According to an embodiment illustrated in FIG. 1, the scan driving circuit SDC and the emission driving circuit EDC are arranged to face each other while the pixels PX are interposed between the scan driving circuit SDC and the emission driving circuit EDC. However, the disclosure is not limited thereto. In another embodiment, for example, the scan driving circuit SDC and the emission driving circuit EDC may be positioned adjacent to each other at one of the first side and the second side of the display panel DP. According to an embodiment, the scan driving circuit SDC and the emission driving circuit EDC may be integrally implemented into one circuit (e.g., a same single chip).

Each of the plurality of pixels PX may be electrically connected to four scan lines and one emission control line. In an embodiment, for example, as illustrated in FIG. 1, pixels in a first row may be connected to the first to fourth scan lines GIL1, GCL1, GWL1, and GBL1 and the emission control line EML1. Furthermore, pixels in a j-th row may be connected to the corresponding scan lines GILj, GCLj, GWLj, and GBLj and a corresponding emission control line EMLj.

Each of the plurality of pixels PX includes a light emitting element ED (see FIG. 2) and a pixel driving circuit PXC (see FIG. 2) to control the light emitting element ED to emit light. The pixel driving circuit PXC may include at least one transistor and at least one capacitor. The scan driving circuit SDC and the emission driving circuit EDC may include transistors formed through a same process as processes for forming the pixel driving circuit PXC (see FIG. 2).

Each of the pixels PX may receive the first driving voltage ELVDD, the second driving voltage ELVSS, the reference voltage VREF, and the initialization voltage VINT from the voltage generator 300.

The scan driving circuit SDC may receive the scan control signal SCS from the timing controller 100. The scan driving circuit SDC may output scan signals to the first to fourth scan lines GIL1 to GILn, GCL1 to GCLn, GWL1 to GWLn, and GBL1 to GBLn in response to the scan control signal SCS.

Figure 2:
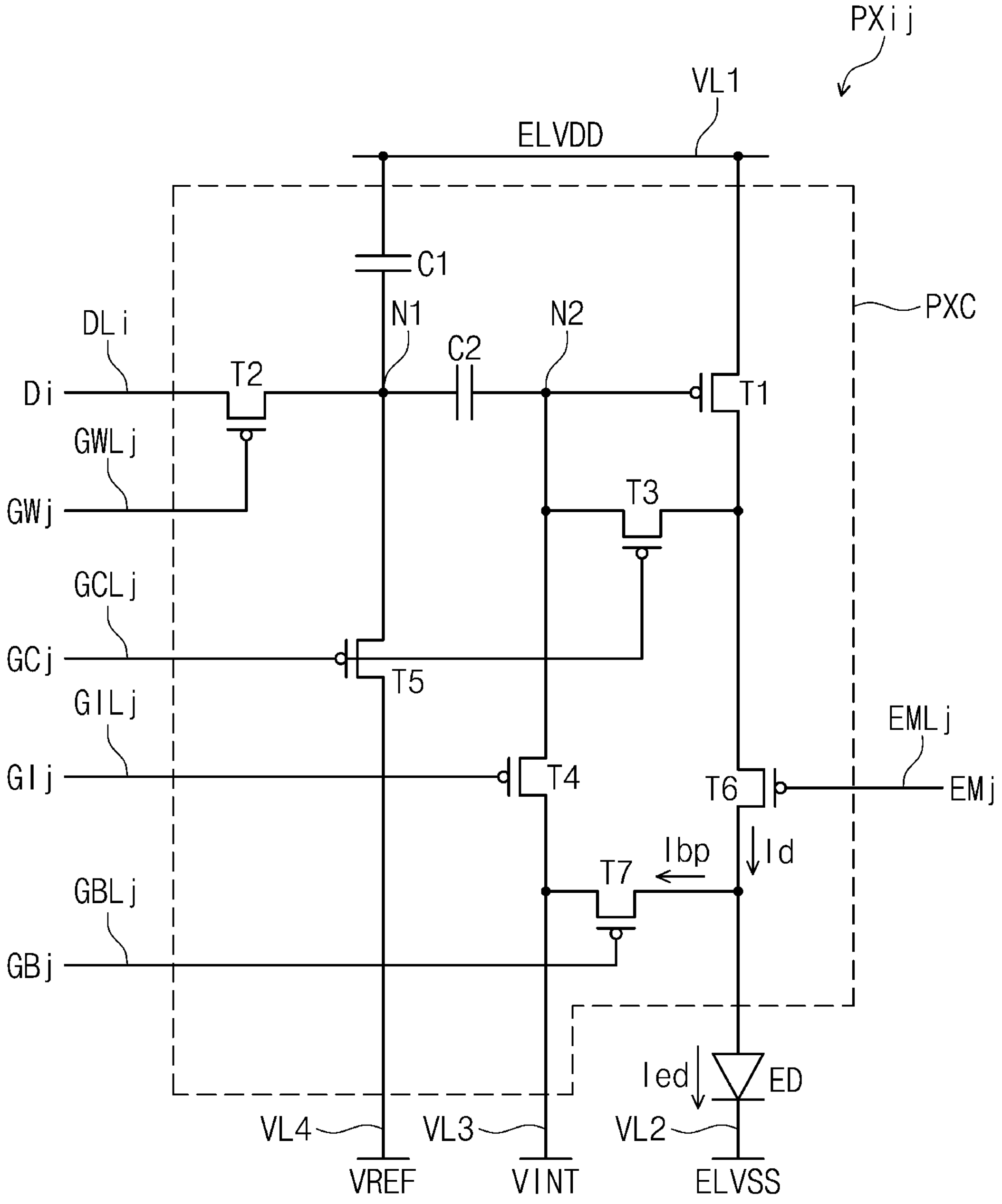
FIG. 2 is an equivalent circuit diagram of a pixel, according to an embodiment of the disclosure.

FIG. 2 is an equivalent circuit diagram of a pixel, according to an embodiment of the disclosure.

FIG. 2 illustrates an equivalent circuit diagram of a pixel connected to an i-th data line DLi among the data lines DL1 to DLm, the j-th first to fourth scan lines GILj, GCLj, GWLj, and GBLj among the first to fourth scan lines GIL1 to GILn, GCL1 to GCLn, GWL1 to GWLn, and GBL1 to GBLn, and the j-th emission control line EMLj among the emission control lines EML1 to EMLn.

Each of pixels PX illustrated in FIG. 1 may have a same circuit configuration as the equivalent circuit diagram of a pixel PXij illustrated in FIG. 2.

Referring to FIG. 2, according to an embodiment, the pixel PXij includes the pixel driving circuit PXC and at least one light emitting element ED. The pixel driving circuit PXC may include first to seventh transistors T1, T2, T3, T4, T5, T6, and T7, a first capacitor C1, and a second capacitor C2. The light emitting element ED may be a light emitting diode. Hereinafter, an embodiment where one pixel PXij includes one light emitting element ED will be described by way of example. The pixel PXij according to an embodiment of the disclosure may be referred to as having 7T1C structure.

According to an embodiment, each of the first to seventh transistors T1 to T7 is a P-type transistor having a low-temperature polycrystalline silicon (LTPS) semiconductor layer. However, the disclosure is not limited thereto. According to an embodiment, each of the first to seventh transistors T1 to T7 may be an N-type transistor including a semiconductor layer including an oxide semiconductor. According to another embodiment, at least one selected from the first to seventh transistors T1 to T7 may be an N-type transistor, and the remaining transistors of the first to seventh transistors T1 to T7 may be P-type transistors. In addition, a circuit configuration of a pixel according to an embodiment of the disclosure is not limited to FIG. 2. The pixel driving circuit PXC illustrated in FIG. 2 is provided for the illustrative purpose, and the configuration of the pixel driving circuit PXC may be variously modified and implemented.

The first to fourth scan lines GILj, GCLj, GWLj, and GBLj may transmit first to fourth scan signals Gij, GCj, GWj, and GBj, respectively, and the emission control line EMLj may transmit an emission signal EMj. The data line DLi may transmit a data signal Di. The data signal Di may have a voltage level corresponding to the output image signal O_RGB (see FIG. 1) output from the timing controller 100 (see FIG. 1). First to fourth driving voltage lines VL1, VL2, VL3, and VL4 may transmit the first driving voltage ELVDD, the second driving voltage ELVSS, the initialization voltage VINT, and the reference voltage VREF, respectively.

The first capacitor C1 is connected between the first driving voltage line VL1 and a first node N1. The second capacitor C2 may be connected between the first node N1 and a second node N2.

The first transistor T1 may include a first electrode connected to the first driving voltage line VL1, a second electrode electrically connected to an anode of the light emitting element ED via the sixth transistor T6, and a gate electrode connected to the second node N2. The first transistor T1 may receive the data signal Di, which is transmitted by the data line DLi, to the gate electrode via the second capacitor C2 depending on the switching operation of the second transistor T2 to supply a driving current Id to the light emitting element ED.

The second transistor T2 may include a first electrode connected to the data line DLi, a second electrode connected to the first node N1, and a gate electrode connected to the third scan line GWLj. The second transistor T2 may be turned on in response to the third scan signal GWj received through the third scan line GWLj to transmit the data signal Di transmitted from the data line DLi to the first node N1.

The third transistor T3 may include a first electrode connected to the second electrode of the first transistor T1, a second electrode connected to the second node N2 (that is, the gate electrode of the first transistor T1), and a gate electrode connected to the second scan line GCLj. The third transistor T3 may be turned on in response to the second scan signal GCj transmitted through the second scan line GCLj to connect the gate electrode of the first transistor T1 to the second electrode, such that the first transistor T1 is diode-connected.

The fourth transistor T4 may include a first electrode connected to the second node N2, a second electrode connected to the third driving voltage line VL3 for transmitting the initialization voltage VINT, and a gate electrode connected to the first scan line GILj. The fourth transistor T4 may be turned on in response to the first scan signal GIj transmitted through the first scan line GILj to transmit the initialization voltage VINT to the gate electrode of the first transistor T1 to perform an initialization operation for initializing the voltage of the gate electrode of the first transistor T1.

The fifth transistor T5 may include a first electrode connected to the first node N1, a second electrode connected to the fourth driving voltage line VL4 for transmitting the reference voltage VREF, and a gate electrode connected to the second scan line GCLj. The fifth transistor T5 may be turned on in response to the second scan signal GCj transmitted through the second scan line GCLj to transmit the reference voltage VREF to the first node N1.

The sixth transistor T6 may include a first electrode connected to the second electrode of the first transistor T1, a second electrode connected to the anode of the light emitting element ED, and a gate electrode connected to the emission control line EMLj.

The sixth transistor T6 may be turned on in response to the emission signal EMj received through the emission control line EMLj. As the sixth transistor T6 is turned on, a current path may be formed between the first driving voltage line VL1 and the light emitting element ED through the first transistor T1 and the sixth transistor T6.

The seventh transistor T7 may include a first electrode connected to an anode of the light emitting element ED, a second electrode connected to the third driving voltage line VL3, and a gate electrode connected to the fourth scan line GBLj. The seventh transistor T7 may be turned on in response to the fourth scan signal GBj received through the fourth scan line GBLj to bypass the current of the anode of the light emitting element ED to the third driving voltage line VL3. In other words, a bypass current Ibp may flow by the seventh transistor T7.

The light emitting element ED includes the anode connected to the second electrode of the sixth transistor T6 and a cathode connected to the second driving voltage line VL2. The light emitting element ED may emit light based on a light emitting current Ied.

Figure 3A:
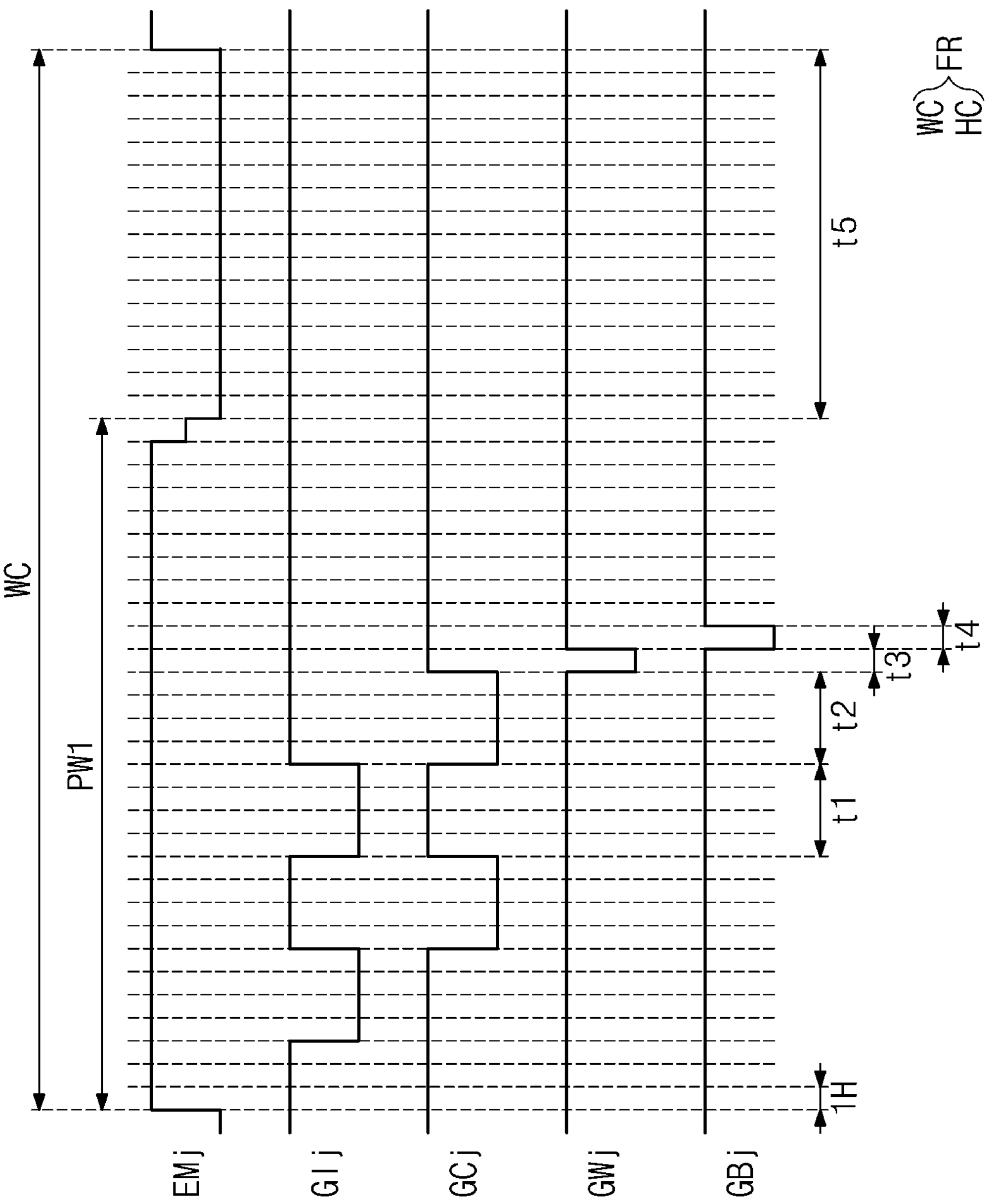
FIGS. 3A and 3B are signal timing diagrams illustrating the operation of a pixel illustrated in FIG. 2.
Figure 3B:
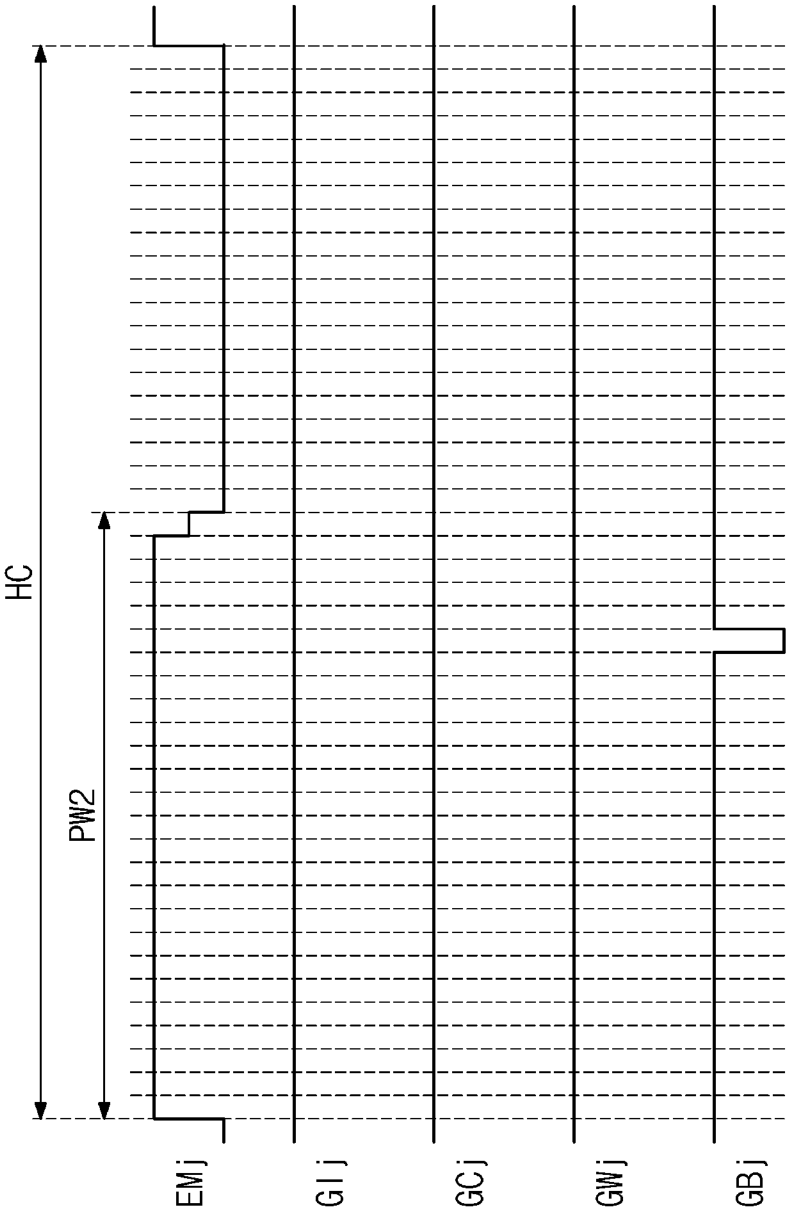

FIGS. 3A and 3B are signal timing diagrams illustrating an operation of the pixel illustrated in FIG. 2. FIG. 3A illustrates a signal provided to a pixel in a first period, and FIG. 3B illustrates a signal provided to a pixel in a second period.

Referring to FIGS. 2, 3A, and 3B, the display panel DP (see FIG. 1) may be driven in unit of frames FR. The frame FR may include a write cycle WC and a hold cycle HC.

One frame FR may include one write cycle WC and at least one hold cycle HC. The numbers of write cycles WC and hold cycles HC in one frame FR may vary depending on driving frequencies.

The timing controller 100 (see FIG. 1) may drive one of the units of the frame FR of the display panel DP (see FIG. 1) at a first driving frequency, and may drive another of the units of the frame FR at a second driving frequency which is different from the first driving frequency. In an embodiment, for example, each of the write cycle WC and the hold cycle HC may operate at a frequency of 240 hertz (Hz), and the timing controller 100 (see FIG. 1) may drive the one of the units of the frame FR with one write cycle WC and one hold cycle HC. In this case, the first driving frequency of the one of the units of the frame FR may be 120 hertz (Hz). The timing controller 100 (see FIG. 1) may drive the another of the units of the frame FR with one write cycle WC and seven hold cycles HC. In this case, the second driving frequency of the another of the units of the frame FR may be 30 hertz (Hz).

The emission signal EMj and the first to fourth scan signals GIj, GCj, GWj, and GBj may be activated in the write cycle WC.

The first scan signal GIj may be provided at a low level through the first scan line GILj during an initialization period t1 in the write cycle WC. The fourth transistor T4 is turned on in response to the first scan signal GIj at the low level, and the initialization voltage VINT is transmitted to the gate electrode of the first transistor T1 through the fourth transistor T4, such that the first transistor T1 may be initialized.

Next, when the second scan signal GCj is provided at the low level through the second scan line GCLj during a compensation period t2, the third transistor T3 may be turned on. The first transistor T1 may be diode-connected by the third transistor T3 turned on and may be biased in a forward direction. Therefore, the potential across the second node N2 may be set as a difference (ELVDD-Vth) between the first driving voltage ELVDD and a threshold voltage (Vth) of the first transistor T1.

In addition, the fifth transistor T5 may be turned on in response to the second scan signal GCj at the low level. The reference voltage VREF may be supplied to the first node N1 through the fifth transistor T5 turned on.

To minimize the influence of the data signal Di during the previous frame in the pixel PXij, the initialization period t1 and the compensation period t2 in one frame may be repeated at least two times.

The scan signal GWj at the low level may be provided through the scan line GWLj during a programming period t3. The second transistor T2 is turned on in response to the scan signal GWj at the low level, and the data signal Di may be transmitted to the first node N1 through the second transistor T2. In this case, the potential across the second node N2 may increase by the voltage level of the data signal Di. Then, a compensation voltage, which is reduced by the threshold voltage Vth of the first transistor T1 from the data signal Di supplied from the data line DLi, may be applied to the gate electrode of the first transistor T1. In other words, the gate voltage applied to the gate electrode of the first transistor T1 may be the compensation voltage.

The seventh transistor T7 may be turned on by receiving the fourth scan signal GBj at the low level through the fourth scan line GBLj during a bypass period t4. A portion of the driving current Id may flow out of the seventh transistor T7 while serving as the bypass current Ibp through the seventh transistor T7.

Even when the minimum current of the first transistor T1, which is to display the black image, flows as the driving current, when the light emitting element ED emits light, the black image may not be properly displayed. Therefore, according to an embodiment of the disclosure, the seventh transistor T7 in the pixel PXij may distribute a portion of the minimum current of the first transistor T1, which serves as the bypass current Ibp, to a current path other than a current path toward the light emitting element ED. In this case, the minimum current of the first transistor T1 may refer to a current under the condition that the first transistor T1 is turned off as the gate-source voltage of the first transistor T1 is less than the threshold voltage (Vth). As the minimum driving current is transmitted to the light emitting element ED under the condition that the first transistor T1 is turned off, an image may be displayed with black brightness. When the minimum driving current flows to express the black image, the influence of the bypass current is relatively greatly exerted. When a large current flows to display an image, such as a normal image or a white image, the influence of the bypass current Ibp is negligible. Accordingly, when the driving current Id flows to display the black image, a light emitting current of the light emitting element ED, which is reduced by the amount of the bypass current Ibp, which flows out of the seventh transistor T7, from the driving current Id may have the minimum current amount to firmly express the black image. Accordingly, a black brightness image is accurately implemented using the seventh transistor T7. Accordingly, the contrast ratio may be improved. According to an embodiment, the bypass signal is the fourth scan signal GBj at a low level, but the disclosure is not limited thereto.

Next, the sixth transistor T6 may be turned on in response to the emission signal EMj at the low level during a light emitting period t5. Then, the driving current Id is generated due to the voltage difference between the gate voltage across the gate electrode of the first transistor T1 and the first driving voltage ELVDD, and the driving current Id is supplied to the light emitting element ED through the sixth transistor T6 such that the light emitting current led flows through the light emitting element ED.

While the emission signal EMj is at a high level, the sixth transistor T6 may be maintained turned off, and the light emitting element ED may not emit light. During the period in which the emission signal EMj is at a high level, the emission signal EMj may have a first pulse width PW1. While the emission signal EMj is at a low level, the sixth transistor T6 may be maintained turned on, and the light emitting element ED may emit light during the light emitting period t5 by the driving current Id.

According to an embodiment, each of the programming period t3 and the bypass period t4 may be a 1 horizontal period 1H. As illustrated in FIG. 3A, the first pulse width PW1 has 30 horizontal periods (30 H). According to an embodiment, the first pulse width PW1 may vary depending on the driving frequency and the gray level of the input image signal I_RGB.

In the hold cycle HC, the emission signal EMj and the fourth scan signal GBj may be activated, and the first to third scan signals GIj, GCj and GWj may be deactivated. In an embodiment, for example, the emission signal EMj and the fourth scan signal GBj may be at a low level, and the first to third scan signals GIj, GCj and GWj may be at a high level.

The emission signal EMj may have a second pulse width PW2. The second pulse width PW2 may vary depending on the driving frequency and the gray level of the input image signal I_RGB. In an embodiment, for example, the second pulse width PW2 may have a width different from which of the first pulse width PW1.

Figure 4:
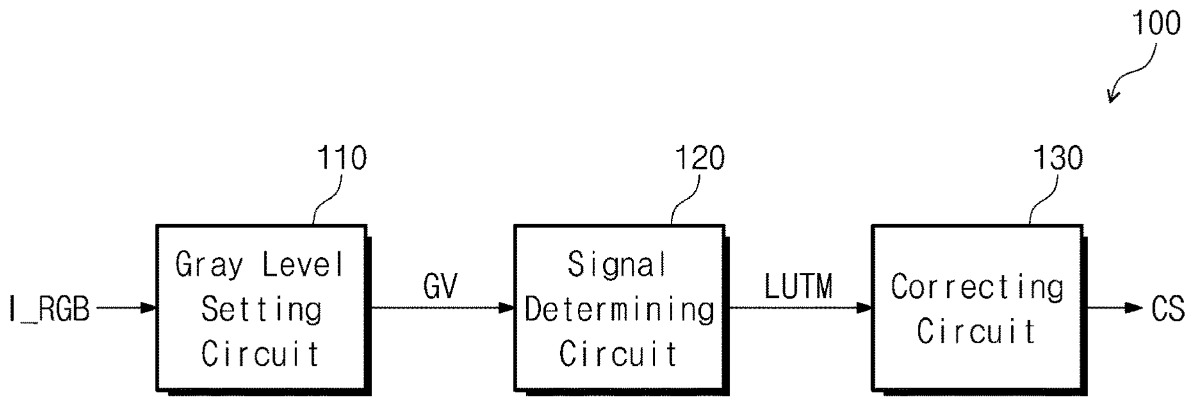
FIG. 4 is a block diagram illustrating a timing controller according to an embodiment of the disclosure.
Figure 5A:
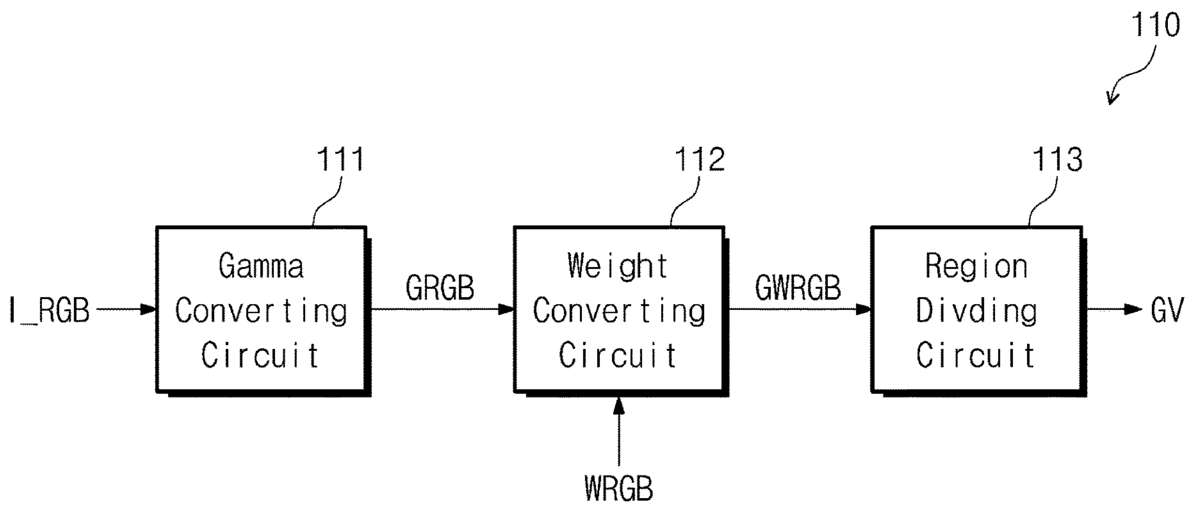
FIGS. 5A to 5C are views illustrating a gray level setting circuit according to an embodiment of the disclosure.
Figure 5B:
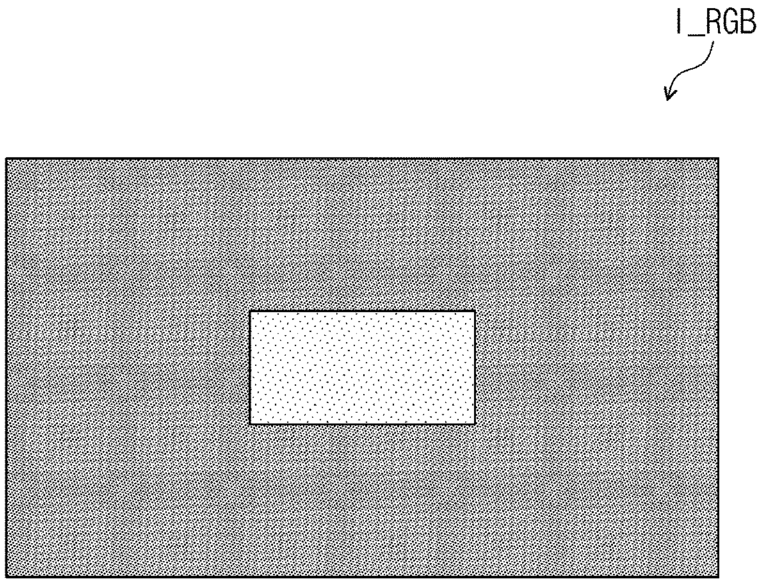
Figure 5C:
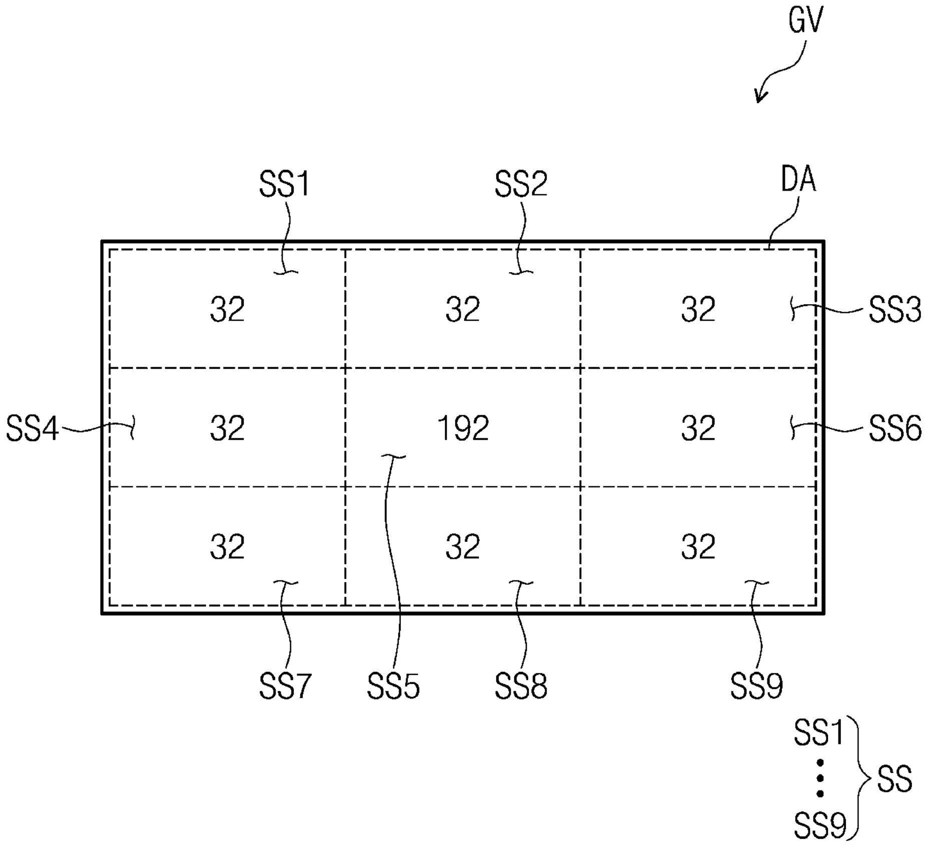
Figure 6A:
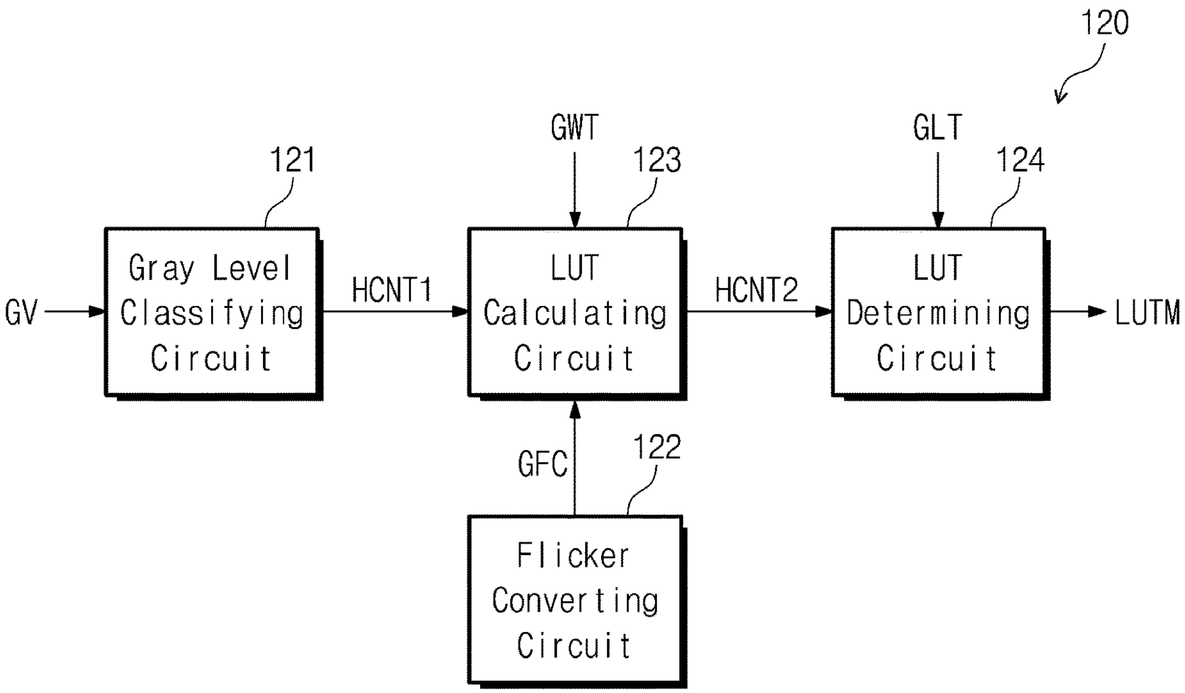
FIGS. 6A to 6C are views illustrating a signal determining circuit according to an embodiment of the disclosure.
Figure 6B:
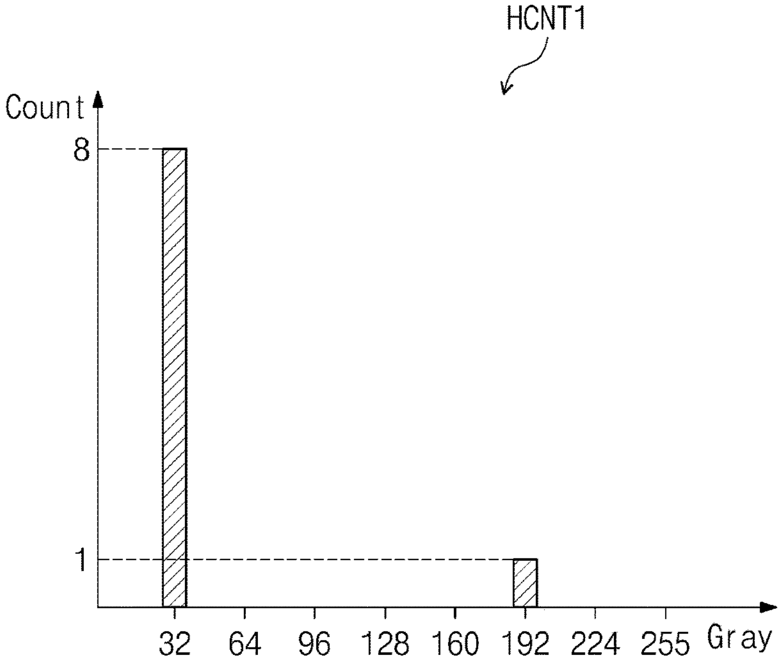
Figure 6C:
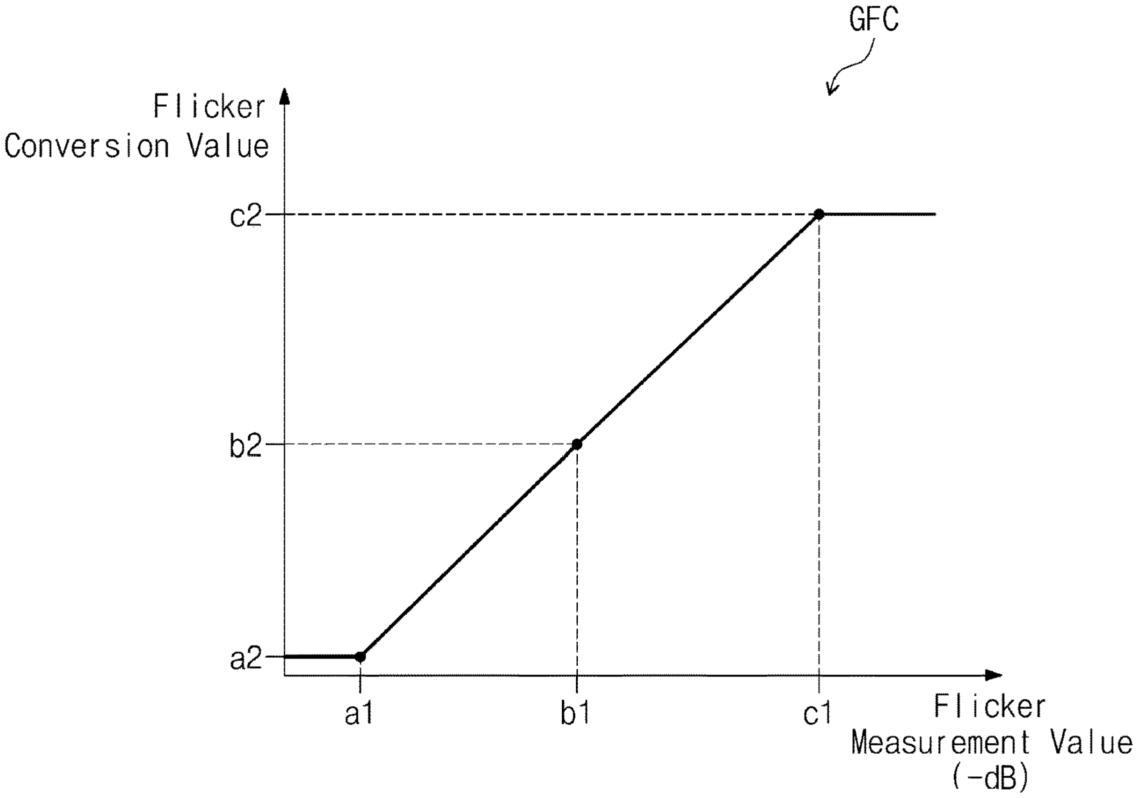

FIG. 4 is a block diagram illustrating a timing controller according to an embodiment of the disclosure. FIGS. 5A to 5C are diagrams illustrating a gray level setting circuit according to an embodiment of the disclosure. FIGS. 6A to 6C are diagrams illustrating a signal determining circuit according to an embodiment of the disclosure.

Referring to FIGS. 4 to 6C, an embodiment of the timing controller 100 may include a gray level setting circuit 110, a signal determining circuit 120, and a correcting circuit 130.

In an embodiment, as shown in FIG. 4, the gray level setting circuit 110 may receive the input image signal I_RGB from an external processor. The gray level setting circuit 110 may analyze the input image signal I_RGB to generate a plurality of representative gray levels GV corresponding to each of a plurality of regions SS (shown in FIG. 5C).

In an embodiment, as shown in FIG. 5A, the gray level setting circuit 110 may include a gamma converting circuit 111, a weight converting circuit 112, and a region dividing circuit 113.

The gamma converting circuit 111 may receive the input image signal I_RGB. The input image signal I_RGB may include a red image signal, a green image signal, and a blue image signal. The gray level setting circuit 110 may gamma-convert (or perform a gamma conversion on) the input image signal I_RGB to generate a first gray level signal GRGB. The gamma conversion may refer to conversion of a grayscale to an optical scale.

The weight converting circuit 112 may receive the first gray level signal GRGB from the gamma converting circuit 111. The weight converting circuit 112 may receive a weight WRGB from an outside. The weight converting circuit 112 may generate a second gray level signal GWRGB by multiplying the first gray level signal GRGB by the weight WRGB. The weight WRGB may be referred to as a brightness weight. The weight WRGB may be a value for correcting brightness which is substantially recognized by a user for each color. Different weights WRGB may be applied to a red image signal, a green image signal, and a blue image signal. In an embodiment, for example, the weight WRGB of the red image signal may be '3', the weight WRGB of the green image signal may be '6', and the weight WRGB of the blue image signal may be '1'. The first gray level signal GRGB and the second gray level signal GWRGB may be collectively referred to as gray level signals.

The region dividing circuit 113 may receive the second gray level signal GWRGB from the weight converting circuit 112. The region dividing circuit 113 may divide the display region DA into the plurality of regions SS and average the second gray level signal GWRGB with respect to the plurality of regions SS to calculate the plurality of representative gray levels GV. In an embodiment, for example, the plurality of regions SS may include first to ninth regions SS1, SS2, SS3, SS3, SS4, SS5, SS6, SS7, SS8, and SS9. When the input image signal I_RGB corresponds to an image as illustrated in FIG. 5B, the plurality of representative gray levels GV may be calculated as illustrated in FIG. 5C. The representative gray levels GV of the first to fourth regions SS1 to SS4 and the sixth to ninth regions SS6 to SS9 may be 32 gray (i.e., a grayscale level of 32), and the representative gray level GV of the fifth region SS5 may be 192 gray (i.e., a grayscale level of 192).

Referring back to FIG. 4, the signal determining circuit 120 may receive the plurality of representative gray levels GV from the gray level setting circuit 110. The signal determining circuit 120 may select and output an optimal lookup table LUTM, which is one of (or one selected from) a plurality of lookup tables GLT (shown in FIG. 6A), based on the plurality of representative gray levels GV.

In an embodiment, as shown in FIG. 6A, the signal determining circuit 120 may include a gray level classifying circuit 121, a flicker converting circuit 122, a lookup table (LUT) calculating circuit 123, and an LUT determining circuit 124.

The gray level classifying circuit 121 may receive the plurality of representative gray levels GV from the gray level setting circuit 110. The gray level classifying circuit 121 may calculate a first histogram HCNT1 by counting the plurality of representative gray levels GV and classifying the plurality of representative gray levels GV based on a grayscale range.

The grayscale range from 0 gray to 255 gray may be classified in the unit of 32 grays (i.e., a grayscale value difference of 32). For example, the first histogram HCNT1 as illustrated in FIG. 6B may be calculated with respect to the plurality of representative gray levels GV as illustrated in FIG. 5A. Eight representative gray levels GV in first to fourth SS1 to SS4 and sixth to ninth regions S6 to SS9 are provided corresponding to the grayscale range from 0 gray to 32 gray. One representative gray level GV in the fifth region SS5 is provided corresponding to a grayscale range from 161 gray to 192 gray.

The flicker converting circuit 122 may generate a JEITA flicker conversion value GFC by reflecting a gain to a JEITA flicker measurement value which has been already measured, that is, a value measured in advance. The JEITA flicker measurement value may be measured through a JEITA Method Flicker measurement method to quantitatively evaluate a flicker level. The JEITA Method Flicker may be a quantitative value of a flicker defined by the Japan Electronic Information Technology Industry Association.

When the flicker measurement value is equal to or less than 'a1', the flicker conversion value GFC may be fixed as 'a2'. When the flicker measurement value is equal to or less than 'a1', the flicker value may be too large to be considered. For example, 'a1' may be 40 and the unit may be –dB (decibel). When the flicker measurement value is equal to or less than 'a1', the flicker conversion value GFC may be fixed to 'a2', such that a load of the LUT calculating circuit 123 may be reduced.

When the flicker measurement value is greater than 'a1' and less than 'c1', the flicker conversion value GFC may increase depending on the flicker measurement value. In an embodiment, for example, when the flicker measurement value is 'b1', the flicker conversion value GFC may be 'b2' which is between 'a2' and 'c2'.

When the flicker measurement value is greater than or equal to 'c1', the flicker conversion value GFC may be fixed to 'c2'. When the flicker measurement value is greater than or equal to 'c1', the flicker value may be too small to exert an influence on driving the display panel DP (see FIG. 1). In an embodiment, for example, 'a1' may be 60 and the unit thereof may be –dB. When the flicker measurement value is greater than or equal to 'c1', the flicker conversion value GFC may be fixed to 'c2', such that the load of the LUT calculating circuit 123 may be reduced.

The LUT calculating circuit 123 may receive the first histogram HCNT1 from the gray level classifying circuit 121 and receive a flicker conversion value GFC from the flicker converting circuit 122. The LUT calculating circuit 123 may further receive a plurality of gray level weights GWT from an outside.

The plurality of gray level weights GWT may store weights varying depending on grayscale range. In an embodiment, for example, the plurality of gray level weights GWT may have different weights in the grayscale range from 0 gray to 32 gray, the grayscale range from 33 gray to 64 gray, the grayscale range from 65 gray to 96 gray, the grayscale range from 97 gray to 128 gray, the grayscale range from 129 gray to 160 gray, the grayscale range from 161 gray to 192 gray, the grayscale range from 193 gray to 224 gray, and the grayscale range from 225 gray to 255 gray.

The LUT calculating circuit 123 may calculate a second histogram HCNT2 by performing the computation operation with respect to the plurality of gray level weights GWT, the flicker conversion value GFC, and the first histogram HCNT1.

The LUT determining circuit 124 may receive the second histogram HCNT2 from the LUT calculating circuit 123. The LUT determining circuit 124 may further receive the plurality of lookup tables GLT from an outside.

The plurality of lookup tables GLT may store a pulse width or a duty ratio of the emission signal EMj (see FIG. 3B) depending on the grayscale range. In an embodiment, for example, one lookup table may store the pulse width of the emission signal EMj (see FIG. 3B) suitable for a higher gray level, and another lookup table may store the pulse width of the emission signal EMj (see FIG. 3B) suitable for a lower gray level. Another lookup table may store the pulse width of the emission signal EMj (see FIG. 3B) suitable for an intermediate gray level.

The LUT determining circuit 124 may perform a computation operation with respect to the second histogram HCNT2 and the plurality of lookup tables GLT to select a lookup table, which has a maximum result value, among the plurality of lookup tables GLT. The lookup table having the maximum result value may be referred to as the optimal lookup table LUTM.

Referring back to FIG. 4, the correcting circuit 130 may receive the optimal lookup table LUTM from the signal determining circuit 120. The correcting circuit 130 may generate the flicker control signal CS obtained by converting the emission signal EMj (see FIG. 3B), using the optimal lookup table LUTM. The timing controller 100 may determine the pulse width of the emission signal EMj (see FIG. 3B) in the hold cycle HC (see FIG. 3B), based on the flicker control signal CS.

According to an embodiment of the disclosure, the timing controller 100 may divide the display region DA into the plurality of regions SS based on the input image signal I_RGB to calculate the plurality of representative gray levels GV corresponding to the plurality of regions SS, respectively. The timing controller 100 may select the optimal lookup table LUTM from among the plurality of lookup tables GLT based on the plurality of representative gray levels GV. In such an embodiment, the pulse width of the optimal emission signal EMj (see FIG. 3B) may be controlled based on the input image signal I_RGB. In an embodiment, for example, when the input image signal I_RGB mainly includes an image having a lower gray level, a lookup table having the pulse width of the emission signal EMj (see FIG. 3B), in which a flicker is not recognized at the lower gray level, may be selected as the optimal lookup table LUTM. Accordingly, the display device DD (see FIG. 1) having improved display quality may be provided.

Figure 7A:
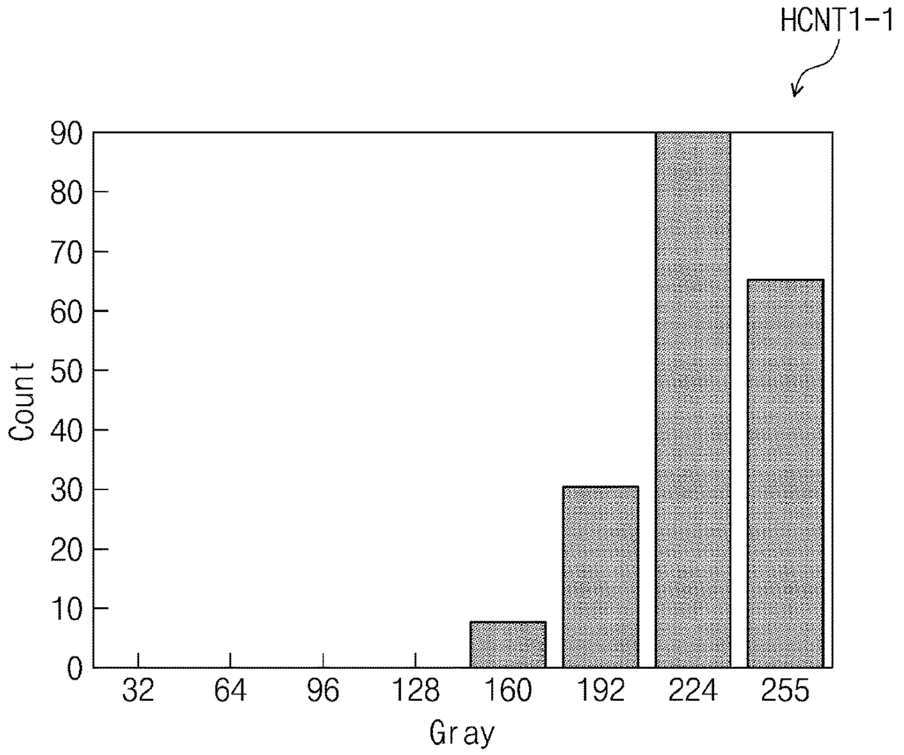
FIGS. 7A and 7B are graphs illustrating a first histogram and a lookup table (LUT) comparison histogram based on a first input image signal according to an embodiment of the disclosure.
Figure 7B:
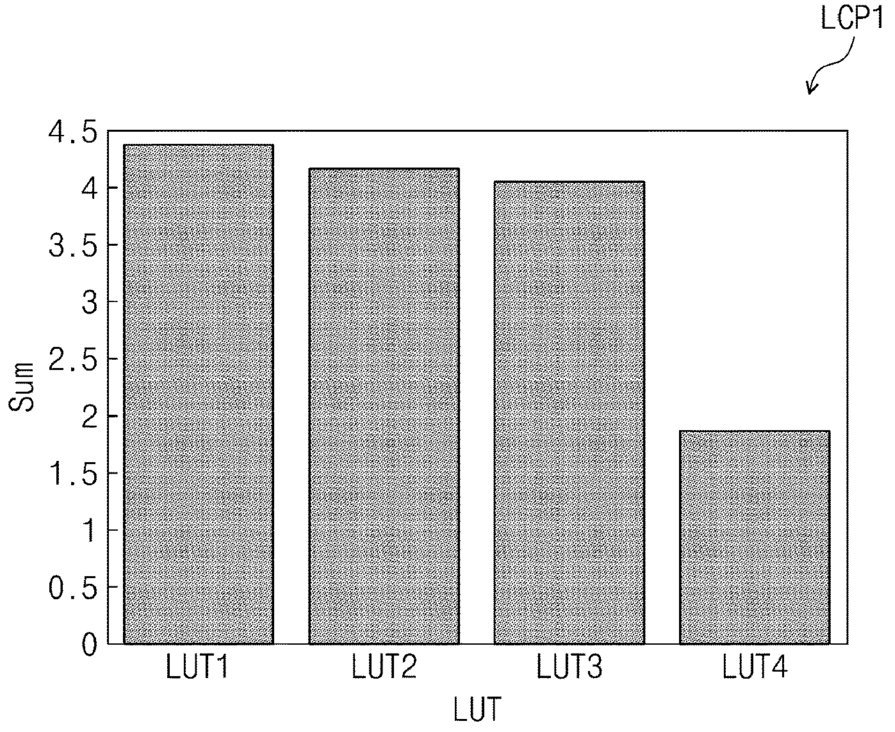
Figure 8A:
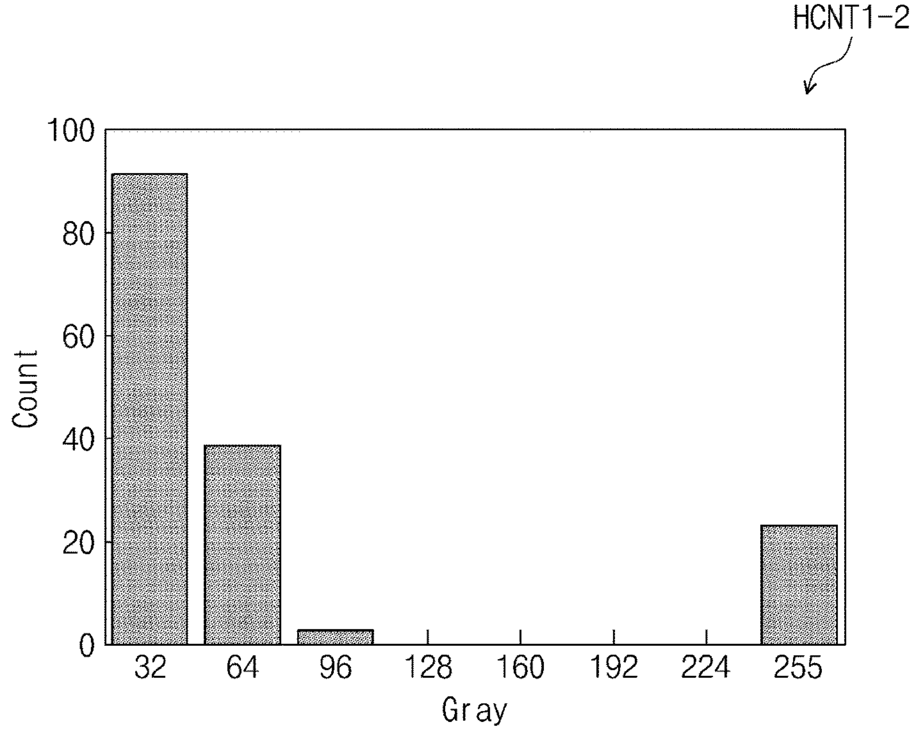
FIGS. 8A and 8B are graphs illustrating a first histogram and an LUT comparison histogram in response to a second input image signal according to an embodiment of the disclosure.
Figure 8B:
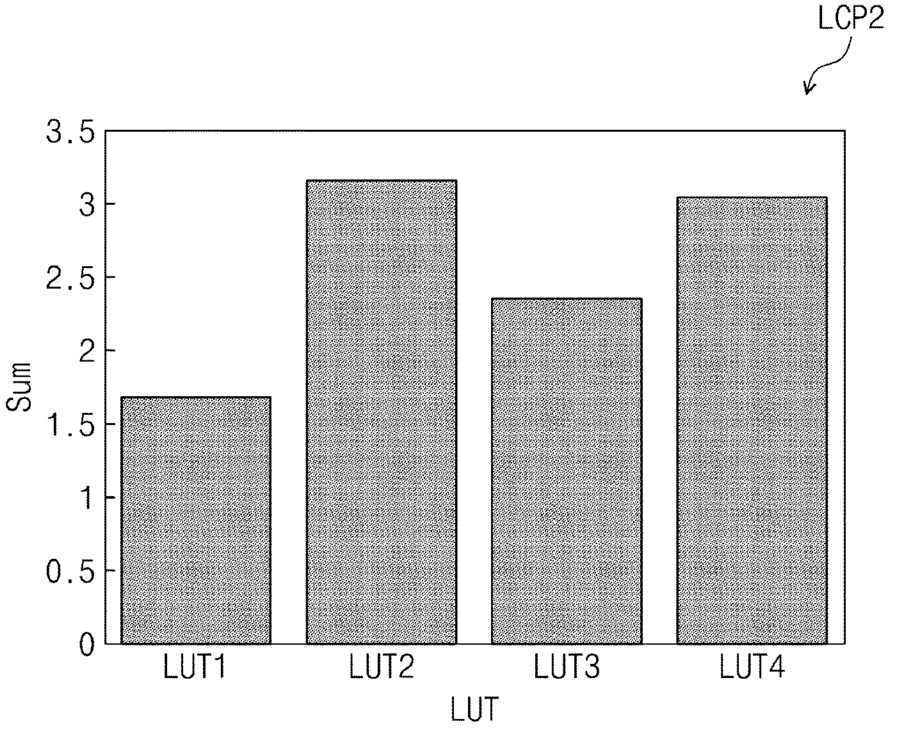
Figure 9A:
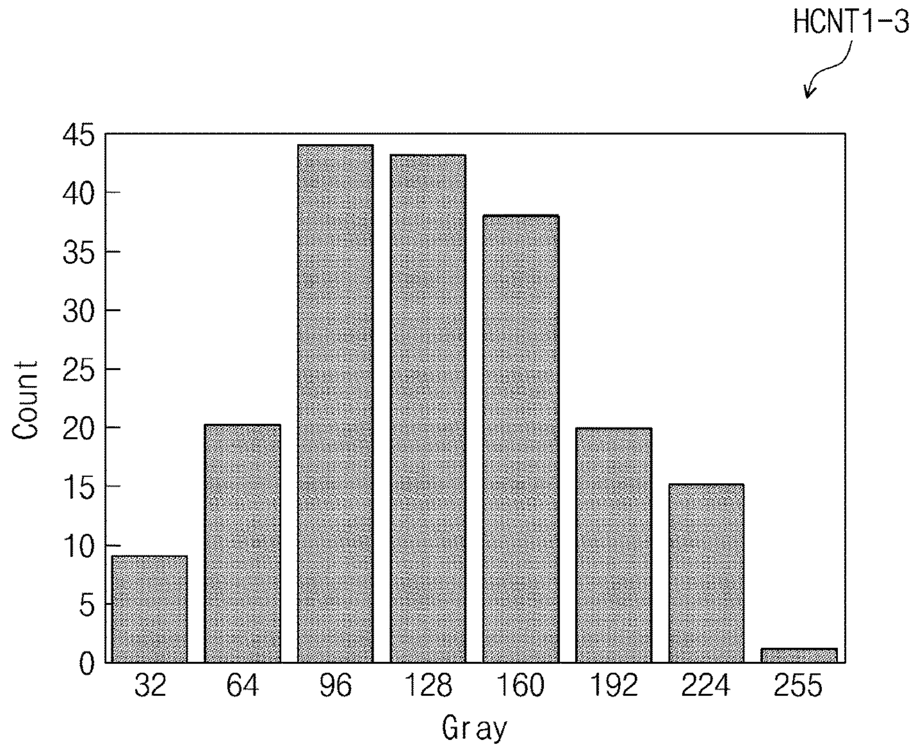
FIGS. 9A and 9B are graphs illustrating a first histogram and an LUT comparison histogram in response to a third input image signal according to an embodiment of the disclosure.
Figure 9B:
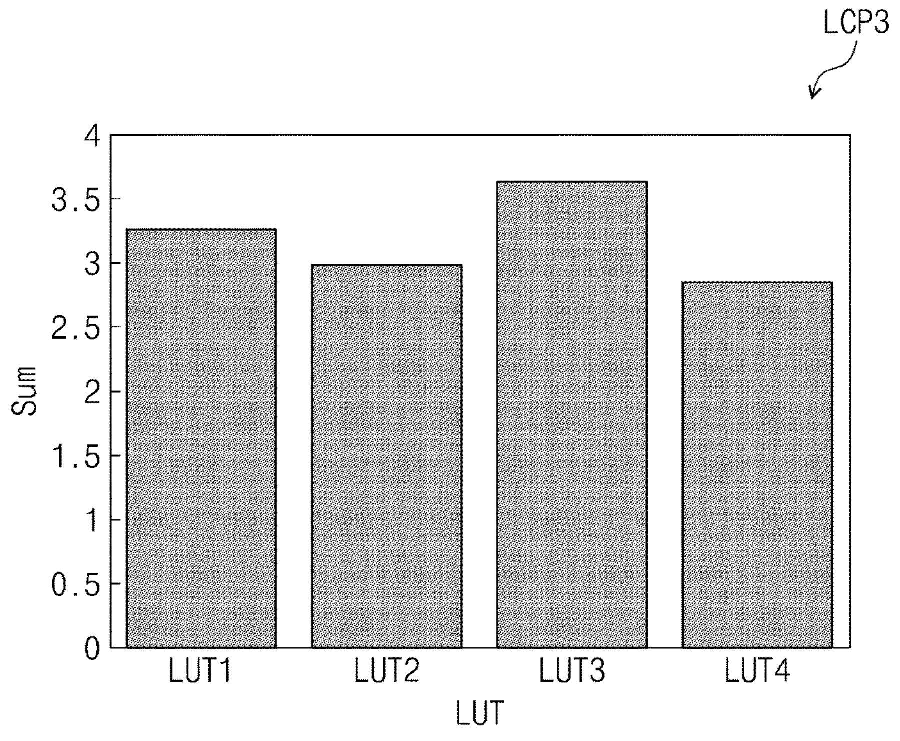
Figure 10A:
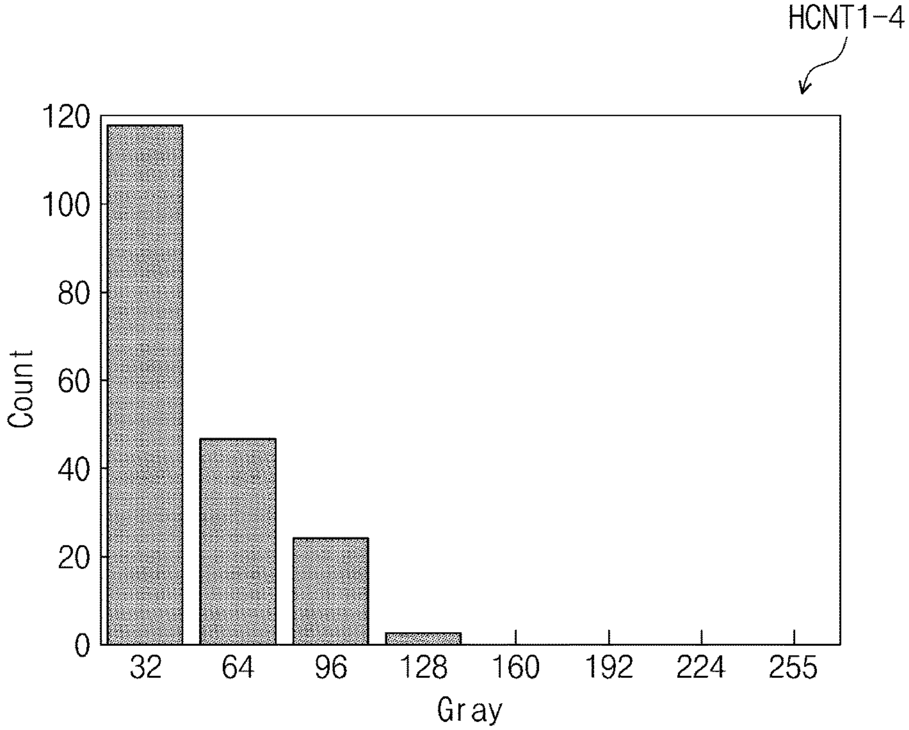
FIGS. 10A and 10B are graphs illustrating a first histogram and an LUT comparison histogram in response to a fourth input image signal according to an embodiment of the disclosure.
Figure 10B:
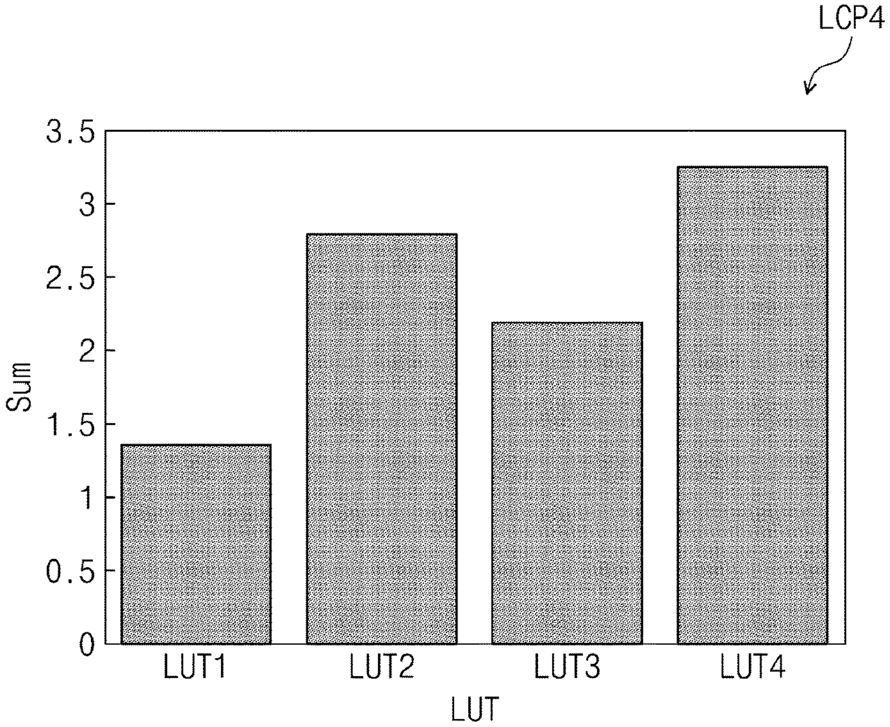

FIGS. 7A and 7B are graphs illustrating a first histogram and an LUT comparison histogram based on a first input image signal according to an embodiment of the disclosure. FIGS. 8A and 8B are graphs illustrating a first histogram and an LUT comparison histogram based on a second input image signal according to an embodiment of the disclosure. FIGS. 9A and 9B are graphs illustrating a first histogram and an LUT comparison histogram based on a third input image signal according to an embodiment of the disclosure. FIGS. 10A and 10B are graphs illustrating a first histogram and an LUT comparison histogram based on a fourth input image signal according to an embodiment of the disclosure.

Referring to FIGS. 4, 6A, and 7A to 10B, in an embodiment, the plurality of lookup tables GLT may include a first lookup table LUT1, a second lookup table LUT2, a third lookup table LUT3, and a fourth lookup table LUT4. Although FIG. 7A to FIG. 10B illustrate four lookup tables LUT1 to LUT4, this is provided only for the illustrative purpose. Accordingly, the number of the plurality of lookup tables LUT according to an embodiment of the disclosure is not limited thereto.

Following Table 1 illustrates the first to fourth lookup tables LUT1 to LUT4 depending on the grayscale range. The grayscale range may include the first to eighth grayscale range. The first to eighth grayscale range may be grouped by dividing 0 gray to 255 gray by a specific number. For example, one grayscale range may be expressed by binding 32 grays into one group. The first grayscale range may indicate a grayscale range from 0 gray to 32 gray. The second grayscale range may indicate a grayscale range from 33 gray to 64 gray. The third grayscale range may indicate a grayscale range from 65 gray to 96 gray. The fourth grayscale range may indicate a grayscale range from 97 gray to 128 gray. The fifth grayscale range may indicate a grayscale range from 129 to 160 gray. The sixth grayscale range may indicate a grayscale range from 161 gray to 192 gray. The seventh grayscale range may indicate a grayscale range from 193 gray to 224 gray. The eighth grayscale range may indicate a grayscale range from 225 gray to 255 gray.

TABLE 1

| Classification | LUT1 | LUT2 | LUT3 | LUT4 |
|---|---|---|---|---|
| First grayscale range | 34 | 60 | 46 | 65 |
| Second grayscale range | 39 | 58 | 48 | 62 |
| Third grayscale range | 45 | 51 | 55 | 58 |
| Fourth grayscale range | 58 | 45 | 64 | 53 |
| Fifth grayscale range | 61 | 51 | 61 | 45 |
| Sixth grayscale range | 69 | 58 | 60 | 41 |
| Seventh grayscale range | 70 | 62 | 61 | 39 |
| Eighth grayscale range | 71 | 65 | 62 | 37 |

Referring to Table 1, the first lookup table LUT1 may have a higher weight in grayscale range having a higher gray level. The second lookup table LUT2 may have a higher weight in grayscale range having a lower gray level and a higher gray level. The third lookup table LUT3 may have a higher weight in grayscale range having an intermediate gray level and a higher gray level. The fourth lookup table LUT4 may have a higher weight in grayscale range having a lower gray level. In an embodiment, the input image signal I_RGB may include first to fourth input image signals. The timing controller 100 may calculate a first histogram HCNT1-1 by calculating the plurality of representative gray levels GV, based on the first input image signal. The first histogram HCNT1-1 may mainly have gray levels belonging to the sixth grayscale to the eighth grayscale. In other words, the first image signal may have an image mainly having higher gray levels. In this case, the timing controller 100 may calculate the second histogram HCNT2 by performing a computation operation with respect to the first histogram HCNT1-1, the plurality of weights GWT, and the flicker conversion value GFC. The timing controller 100 may generate a first LUT comparison histogram LCP1 by performing a computation operation with respect to the second histogram HCNT2 and each of the lookup tables LUT1 to LUT4. In this case, the computation result of the first lookup table LUT1 and the first histogram HCNT1-1 may have the maximum result. Accordingly, the timing controller 100 may select the first lookup table LUT1 as the optimal lookup table LUTM most suitable for the first input image signal.

The timing controller 100 may calculate a first histogram HCNT1-2 by calculating the plurality of representative gray levels GV based on the second input image signal. The first histogram HCNT1-2 may mainly have gray levels belonging to the first, second, and eighth grayscale range. In other words, the second input image signal may have an image signal mainly having lower and higher gray levels. The timing controller 100 may calculate the second histogram HCNT2 by performing a computation operation with respect to the first histogram HCNT1-2, the plurality of weights GWT, and the flicker conversion value GFC. The timing controller 100 may generate a second LUT comparison histogram LCP2 by performing a computation operation with respect to the second histogram HCNT2 and each of the lookup tables LUT1 to LUT4. In this case, the computation result of the second lookup table LUT2 and the first histogram HCNT1-2 may have the maximum result. Accordingly, the timing controller 100 may select the second lookup table LUT2 as the optimal lookup table LUTM most suitable for the second input image signal.

The timing controller 100 may calculate a first histogram HCNT1-3 by calculating the plurality of representative gray levels GV based on the third input image signal. The first histogram HCNT1-3 may mainly have gray levels belonging to the third to fifth grayscale range. In other words, the third input image signal may have an image signal mainly having the intermediate gray levels. The timing controller 100 may calculate the second histogram HCNT2 by performing a computation operation with respect to the first histogram HCNT1-3, the plurality of weights GWT, and the flicker conversion value GFC. The timing controller 100 may generate a third LUT comparison histogram LCP3 by performing a computation operation with respect to the second histogram HCNT2 and each of the lookup tables LUT1 to LUT4. In this case, the computation result of the third lookup table LUT3 and the first histogram HCNT1-3 may have the maximum result. Accordingly, the timing controller 100 may select the third lookup table LUT3 as the optimal lookup table LUTM most suitable for the third input image signal.

The timing controller 100 may calculate a first histogram HCNT1-4 by calculating the plurality of representative gray levels GV based on the fourth input image signal. The first histogram HCNT1-4 may mainly have gray levels belonging to the first to third grayscale range. In other words, the fourth input image signal may have an image signal mainly having the lower gray levels. The timing controller 100 may calculate the second histogram HCNT2 by performing a computation operation with respect to the first histogram HCNT1-4, the plurality of weights GWT, and the flicker conversion value GFC. The timing controller 100 may generate a fourth LUT comparison histogram LCP4 by performing a computation operation with respect to the second histogram HCNT2 and each of the lookup tables LUT1 to LUT4. In this case, the computation result of the fourth lookup table LUT4 and the first histogram HCNT1-4 may have the maximum result. Accordingly, the timing controller 100 may select the fourth lookup table LUT4 as the optimal lookup table LUTM most suitable for the fourth input image signal.

The timing controller 100 may generate the flicker control signal CS obtained by converting the emission signal EMj (see FIG. 3B), using the optimal lookup table LUTM.

In a conventional display device, the timing controller may adjust the pulse width of the emission signal, based on the input image signal including an image mainly having the higher gray level. In this case, even when receiving an image mainly having a lower gray level, the timing controller may identically apply the pulse width of the emission signal suitable for the higher gray level. When the input image signal including the image mainly having the lower gray level is driven through the emission signal suitable for the higher gray level, a hysteresis problem may be caused such that the gray level may gradually increase in one frame, thereby resulting in a difference from the next frame in the optical waveform. Accordingly, the flicker phenomenon may be recognized by a user. According to an embodiment of the disclosure, the timing controller 100 may analyze the grayscale of the input image signal I_RGB to provide the emission signal EMj (see FIG. 3B) suitable for the input image signal I_RGB through the first to fourth lookup tables LUT1 to LUT4 suitable for the lower gray level and the intermediate gray level, as well as the higher gray level. Accordingly, in such an embodiment, the display device DD (see FIG. 1) may perform the optimal compensation for the emission signal in images of the lower gray level, the intermediate gray level, and the higher gray level, such that the user is effectively prevented from recognizing the flicker phenomenon. Accordingly, the display device DD (see FIG. 1) improved in display quality may be provided.

Figure 11:
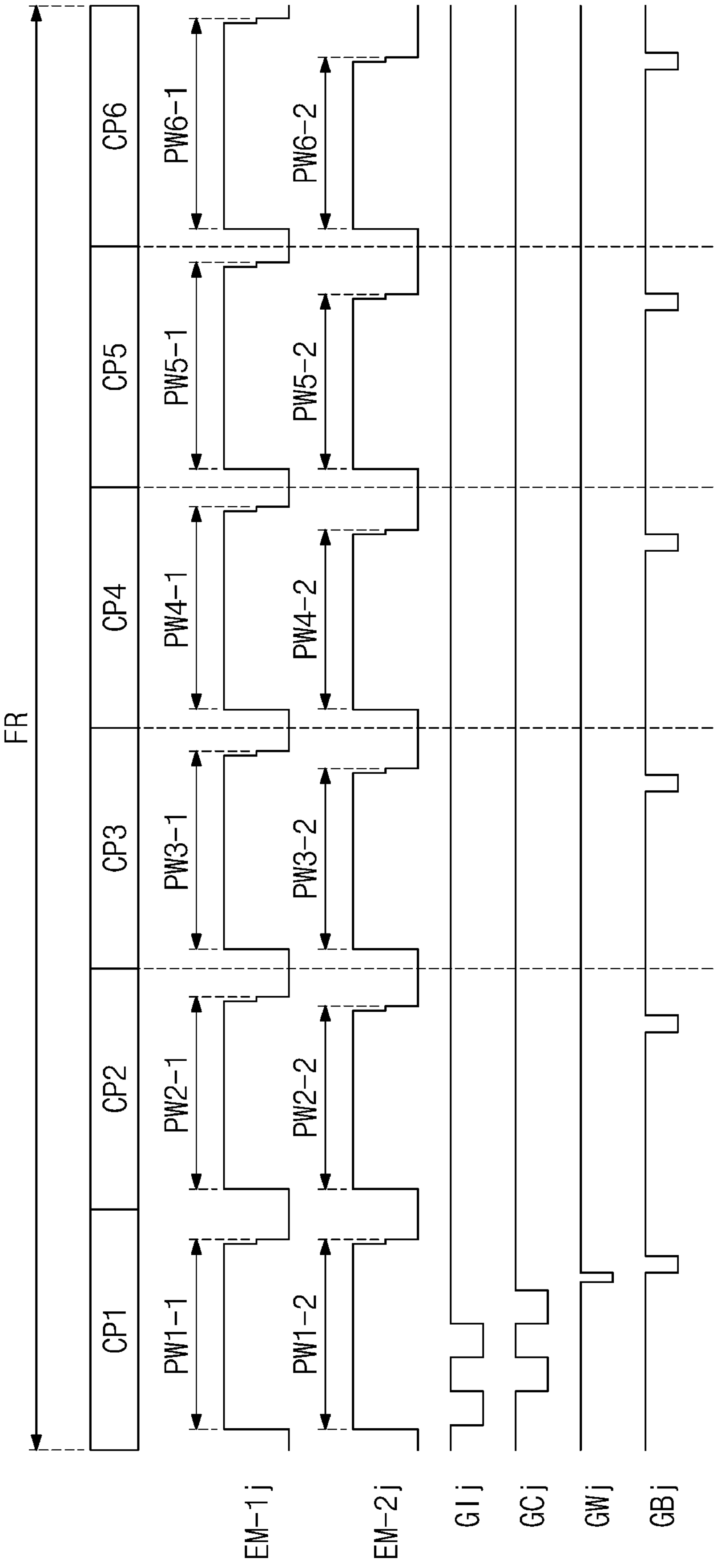
FIG. 11 is a timing diagram of a display panel according to an embodiment of the disclosure.

FIG. 11 is a timing diagram of a display panel according to an embodiment of the disclosure. In the following description made with reference to FIG. 11, the components that are described with reference to FIGS. 3A and 3B are assigned with the same reference numerals, and any repetitive detailed description thereof will be omitted.

Referring to FIGS. 3A, 3B, 4, and 11, one frame FR may include first to sixth periods CP1, CP2, CP3, CP4, CP5, and CP6 subsequent to each other. The first period CP1 may be the write cycle WC, and the second to sixth periods CP2 to CP6 may be the hold cycles HC.

The timing controller 100 may receive the input image signal I_RGB having a higher gray level. During the first to sixth periods CP1 to CP6, the emission signal EM-1*j* may have a first first pulse width (hereinafter, will be referred to as "(1-1)-th pulse width") to a sixth first pulse width (hereinafter, will be referred to as "(6-1)-th pulse width") PW1-1, PW2-1, PW3-1, PW4-1, PW5-1, and PW6-1, respectively.

The (1-1)-th to the (6-1)-th pulse width PW1-1, PW2-1, PW3-1, PW4-1, PW5-1, and PW6-1 may have mutually different values. In an embodiment, for example, the (1-1)-th to the (6-1)-th pulse width PW1-1, PW2-1, PW3-1, PW4-1, PW5-1, and PW6-1 may be gradually widened or increased. The pulse width, which is gradually widened, may compensate for the reduction in gray level, which results from the current loss caused when the display panel DP (see FIG. 1) is driven. However, the disclosure is not limited thereto, and the (2-1)-th to (6-1)-th pulse widths PW2-1 to PW6-1 may vary depending on the pulse width corresponding to the optimal lookup table LUTM.

The timing controller 100 may receive the input image signal I_RGB having a lower gray level. During the first to sixth periods CP1 to CP6, the emission signal EM-2*j* may have a first second pulse width (hereinafter, will be referred to as "(1-2)-th pulse width") to a sixth second pulse width (hereinafter, will be referred to as "(6-2)-th pulse width") PW1-2, PW2-2, PW3-2, PW4-2, PW5-2, and PW6-2, respectively.

The (1-2)-th to the (6-2)-th pulse width PW1-2, PW2-1, PW3-1, PW4-1, PW5-1, and PW6-2 may have mutually different values. In an embodiment, for example, the (1-2)-th to the (6-2)-th pulse width PW1-2, PW2-1, PW3-1, PW4-1, PW5-1, and PW6-2 may be gradually narrowed or decreased. The pulse width, which is gradually narrowed, may compensate for the increase in gray level, which results from the hysteresis caused when the display panel DP (see FIG. 1) is driven. However, the disclosure is not limited thereto, and the (2-2)-th to (6-2)-th pulse widths PW2-2 to PW6-2 may vary depending on the pulse width corresponding to the optimal lookup table LUTM.

According to an embodiment of the disclosure, the timing controller 100 may control the emission signal EM-1*j* when an image having a higher gray level is provided to the display panel DP (see FIG. 1) to be different from the emission signal EM-2*j* when an image having a lower gray level is provided to the display panel DP (see FIG. 1). The timing controller 100 may control the pulse widths of the emission signals EM-1*j* and EM-2*j* to be different from each other by applying the optimal lookup table LUTM (see FIG. 6A) varying depending on the gray levels to the emission signals EM-1*j* and EM-2*j*. Accordingly, the flicker phenomenon caused in each grayscale may not be recognized to the user. Accordingly, the display device DD (see FIG. 1) improved in display quality may be provided.

Figure 12:
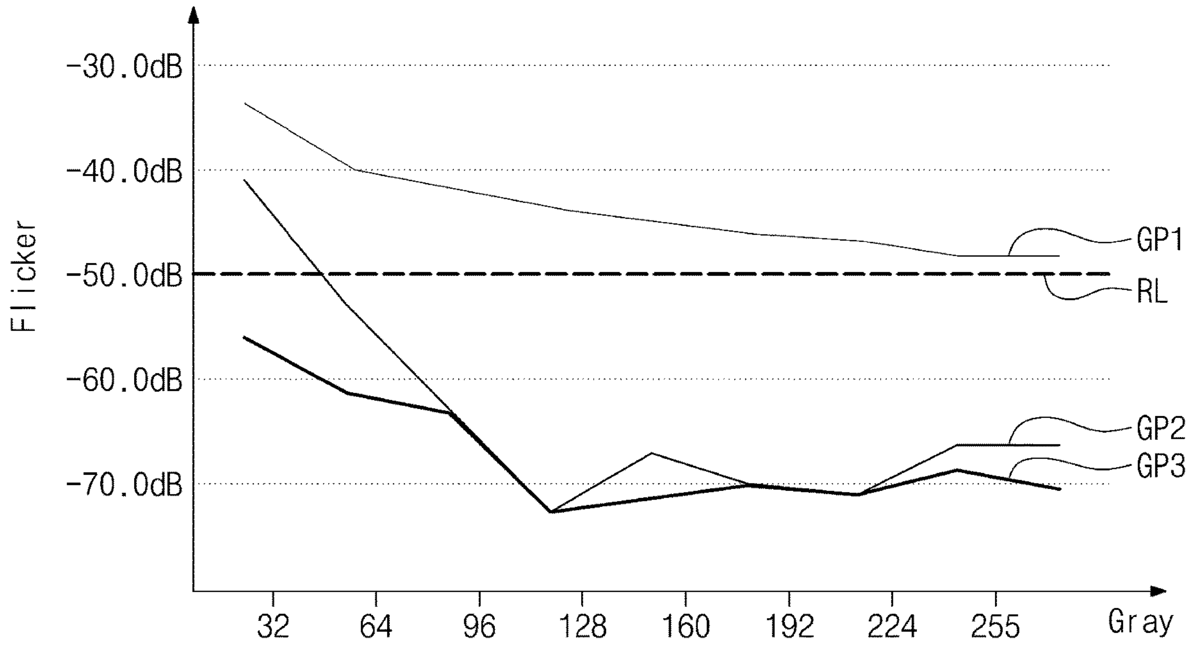
FIG. 12 is a graph illustrating a flicker depending on gray levels according to an embodiment of the disclosure.

FIG. 12 is a graph to describe a flicker phenomenon depending on gray levels according to an embodiment of the disclosure. In FIG. 12, the horizontal axis may indicate a gray level, and the vertical axis may indicate the flicker. The unit of gray level may be 'gray' and the unit of flicker may be 'dB'.

Referring to FIGS. 3B and 12, each of the first to third graphs GP1, GP2, and GP3 may be a graph obtained by measuring the display panel DP (see FIG. 1) driving at a low frequency. For example, the lower frequency may be 30 hertz (Hz). The first graph GP1 shows a flicker at each gray level when the emission signal EMj is not varied. The second graph GP2 shows a flicker at each gray level when the emission signal EMj varies based on one lookup table selected for a higher gray level, without selecting an optimal lookup table. The third graph GP3 shows a flicker at each gray level when the display panel DP (see FIG. 1) driving through the emission signal EMj corresponding to the optimal lookup table LUTM according to an embodiment of the disclosure. A reference line RL may have a value of −50 dB. When the flicker of the display device DD (see FIG. 1) is determined, the determination may be made based on −50 dB. For example, when the flicker exceeds −50 dB, the flicker caused in the display device (DD, see FIG. 1) may be easily recognized by the user. When the flicker is −50 dB or less, the flicker is not recognized by the user such that the display device DD may be determined as having improved quality.

TABLE 2

| Classification | 11G | 23G | 35G | 51G | 87G | 127G | 151G | 203G | 255G |
|---|---|---|---|---|---|---|---|---|---|
| GP1 | −33.6 | −39.4 | −41.6 | −43.6 | −44.6 | −46.1 | −46.7 | −48.2 | −48.5 |
| GP2 | −40.9 | −52.8 | −62.8 | −72.7 | −67.0 | −70.1 | −71.0 | −66.3 | −66.6 |
| GP3 | −56.1 | −61.2 | −63.2 | −72.7 | −71.0 | −70.1 | −71.0 | −68.7 | −70.5 |

Referring to Table 2, the first graph GP1 may have a flicker of −50 dB or more in all gray level sections. The second graph GP2 may have a flicker of −50 dB or more during a lower gray level section of 11 gray. The third graph GP3 may have the flicker of −50 dB or less in all gray level sections. The first graph GP1 and the second graph GP2 may have a flicker of −50 dB or more in the lower gray level section, which is different from the disclosure. When a flicker of −50 dB is caused in the display panel, the user may recognize the flicker phenomenon. However, the third graph GP3 according to an embodiment of the disclosure may have the flicker of −50 dB or less in all gray level sections. When the flicker of −50 dB or less is caused in the display panel DP (see FIG. 1), the user may be prevented from recognizing the flicker phenomenon. Accordingly, the display device DD (see FIG. 1) improved in display quality may be provided.

Figure 13:
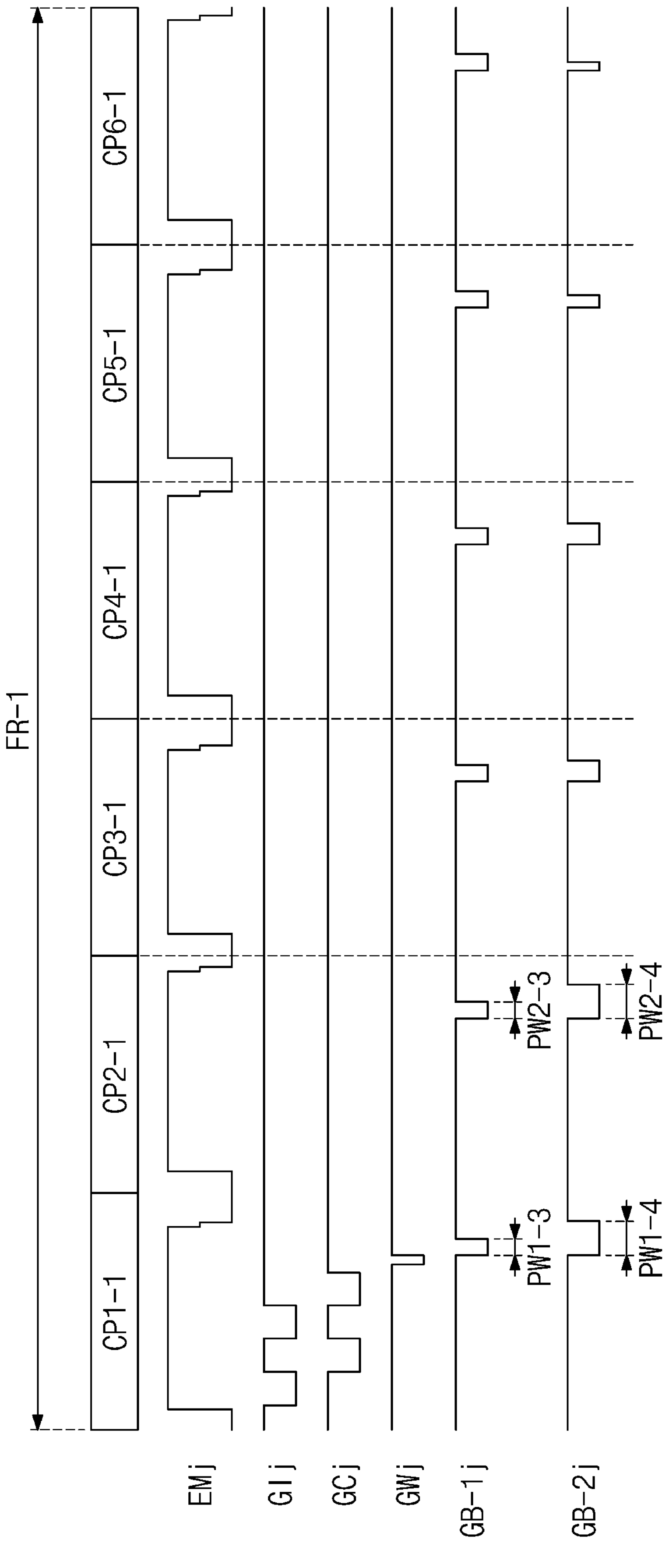
FIG. 13 is a timing diagram of a display panel according to an embodiment of the disclosure.

FIG. 13 is a timing diagram of a display panel according to an embodiment of the disclosure. In the following description made with reference to FIG. 13, the components that are described with reference to FIGS. 3A and 3B are assigned with the same reference numerals, and any repetitive detailed description thereof will be omitted.

Referring to FIGS. 3A, 3B, 4, and 13, one frame FR-1 may include first to sixth periods CP1-1, CP2-1, CP3-1, CP4-1, CP5-1, and CP6-1 subsequent to each other. The first period CP1-1 may be the write cycle WC, and the second to sixth periods CP2-1 to CP6-1 may be the hold cycles HC.

The timing controller 100 may receive the input image signal I_RGB having the higher gray level. During the first to sixth periods CP1-1 to CP6-1, the fourth scan signal GB-1*j* may have different pulse widths from each other. For example, a first pulse width PW1-3 of the fourth scan signal GB-1*j* during the first period CP1-1 may be different from a second pulse width PW2-3 of the fourth scan signal GB-1*j* during the second period CP2-1. The timing controller 100 may control the pulse width of the fourth scan signal GB-1*j* depending on the optimal lookup table LUTM.

The timing controller 100 may receive the input image signal I_RGB having the lower gray level. During the first to sixth periods CP1-1 to CP6-1, a fourth scan signal GB-2*j* may have different pulse widths from each other. For example, a first pulse width PW1-4 of the fourth scan signal GB-2*j* during the first period CP1-1 may be different from a second pulse width PW2-4 of the fourth scan signal GB-2*j* during the second period CP2-1. The timing controller 100 may control the pulse width of the fourth scan signal GB-2*j* depending on the optimal lookup table LUTM.

According to an embodiment of the disclosure, the timing controller 100 may control the fourth scan signal GB-1*j* when an image having a higher gray level is provided to the display panel DP (see FIG. 1) to be different from the fourth scan signal GB-2*j* when the image having the lower gray level is provided to the display panel DP (see FIG. 1). The timing controller 100 may control the pulse widths of the fourth scan signal GB-1*j* and GB-2*j* to be different from each other by applying the optimal lookup table LUTM (see FIG. 6A) varying depending on the gray levels to the fourth scan signal GB-1*j* and GB-2*j*. Accordingly, the flicker phenomenon caused in each gray level may not be recognized by the user. Accordingly, the display device DD (see FIG. 1) improved in display quality may be provided.

Figure 14:
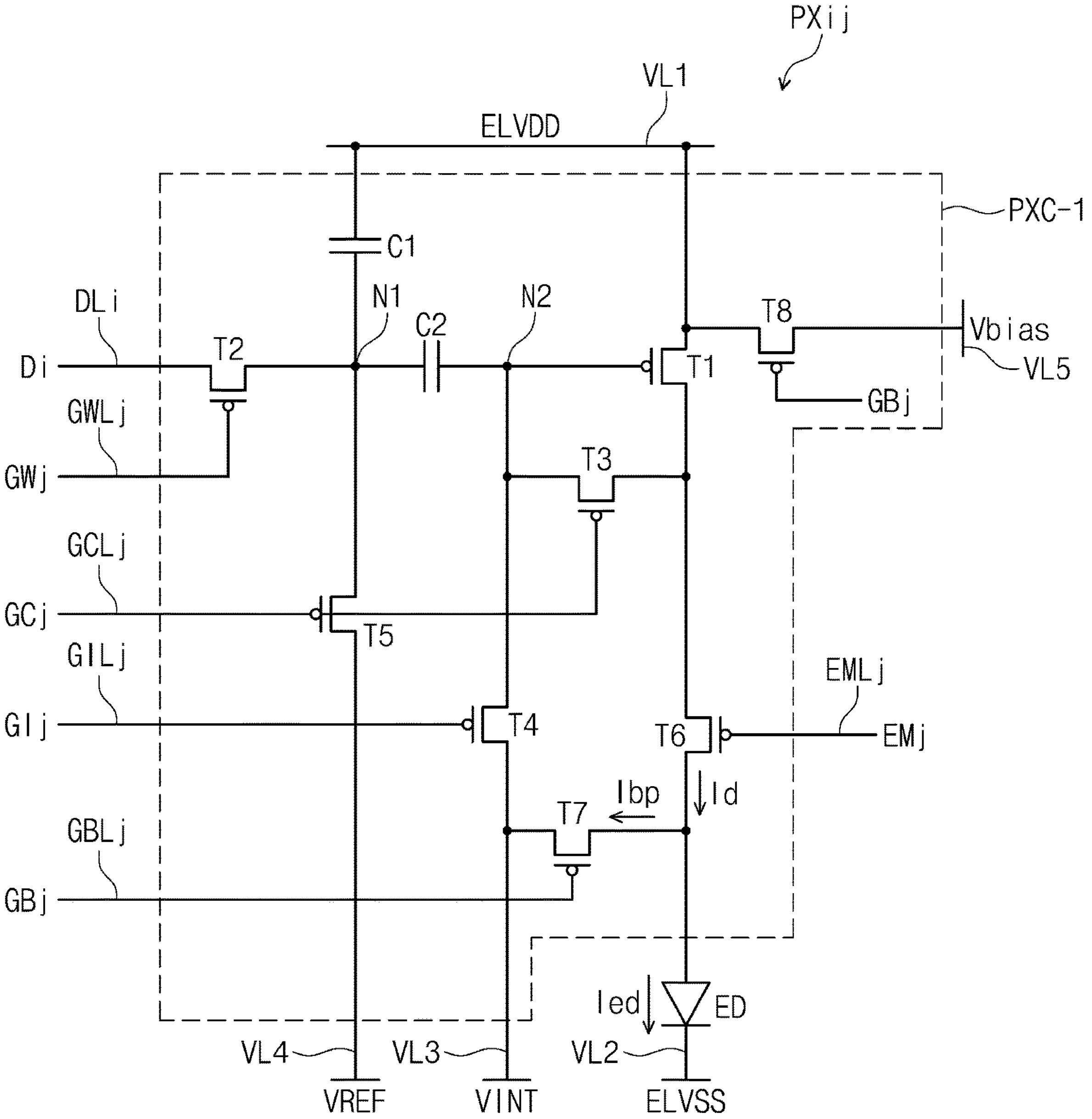
FIG. 14 is an equivalent circuit diagram of a pixel according to an embodiment of the disclosure.

FIG. 14 is an equivalent circuit diagram of a pixel according to an embodiment of the disclosure. In the following description made with reference to FIG. 14, the components that are described with reference to FIG. 2 are assigned with the same reference numerals, and any repetitive detailed description thereof will be omitted.

Referring to FIG. 14, in an embodiment, a pixel driving circuit PXC-1 may further include an eighth transistor T8. The voltage generator 300 (see FIG. 1) may further generate a bias voltage Vbias.

The eighth transistor T8 may be electrically connected between the first electrode of the first transistor T1 and a bias voltage line VL5. The second electrode of the eighth transistor T8 may be electrically connected to the bias voltage line VL5, and the first electrode of the eighth transistor T8 may be electrically connected to the first electrode of the first transistor T1. The gate electrode of the eighth transistor T8 may be electrically connected to the fourth scan line GBLj. The eighth transistor T8 may be turned on in response to the fourth scan signal GBj transmitted through the fourth scan line GBLj to transmit the bias voltage Vbias to the first transistor T1.

According to an embodiment of the disclosure, the bias voltage Vbias is applied to the first transistor T1 through the eighth transistor T8, such that the brightness difference resulting from the hysteresis characteristic of the first transistor T1 may be reduced. Accordingly, the display device DD (see FIG. 1) improved in display quality may be provided.

Figure 15:
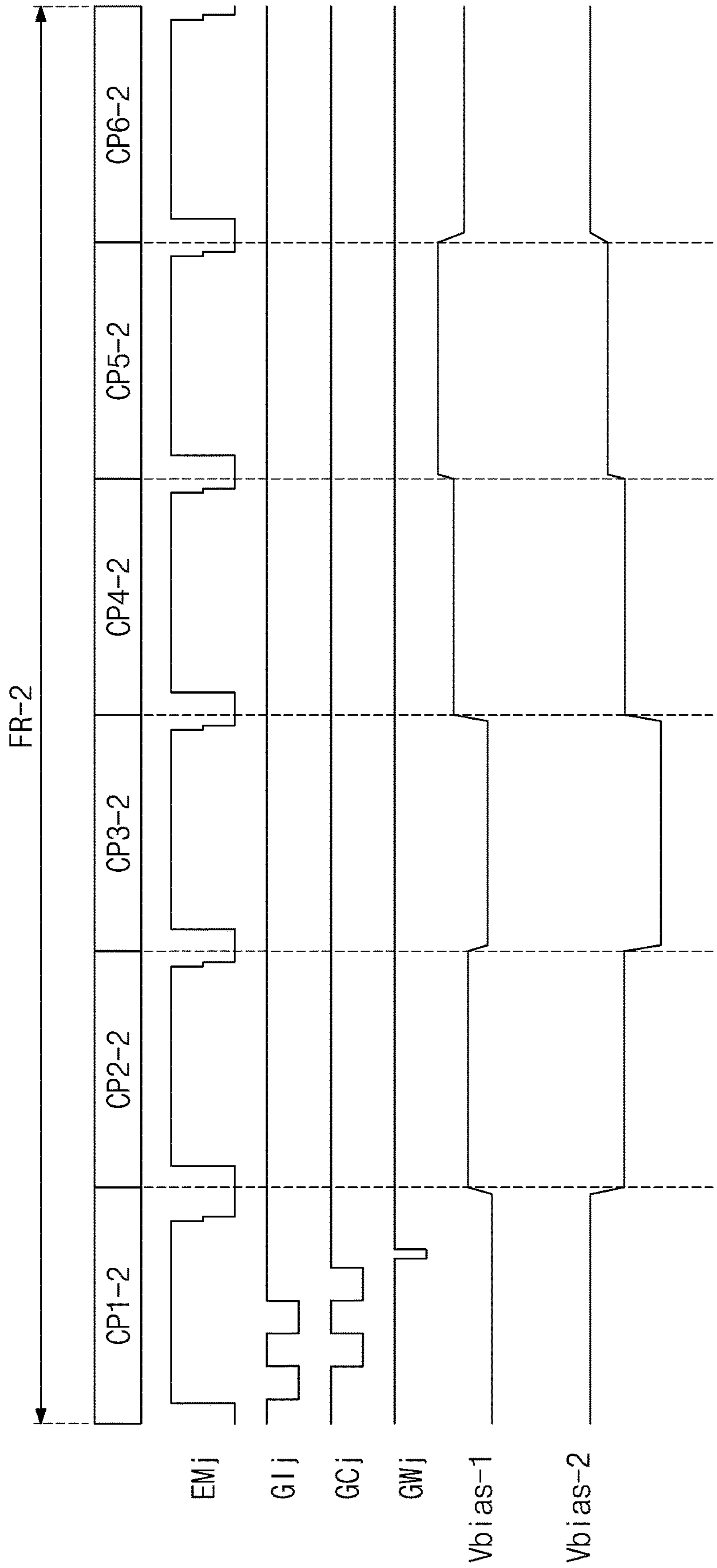
FIG. 15 is a timing diagram of a display panel according to an embodiment of the disclosure.

FIG. 15 is a timing diagram of a display panel according to an embodiment of the disclosure. In the following description made with reference to FIG. 15, the components that are described with reference to FIGS. 3A and 3B are assigned with the same reference numerals, and any repetitive detailed description thereof will be omitted.

Referring to FIGS. 3A, 3B, 4, and 15, one frame FR-2 may include consecutive first to sixth periods CP1-2, CP2-2, CP3-2, CP4-2, CP5-2, and CP6-2 subsequent to each other. The first period CP1-2 may be the write cycle WC, and the second to sixth periods CP2-2 to CP6-2 may be the hold cycles HC.

The timing controller 100 may receive the input image signal I_RGB having the higher gray level. During the first to sixth periods CP1-2 to CP6-2, a bias voltage Vbias-1 may vary. For example, the voltage level of the bias voltage Vbias-1 during the first period CP1-2 may be different from the voltage level of the bias voltage Vbias-1 during the second period CP2-2. The timing controller 100 may control the voltage level of the bias voltage Vbias-1 depending on the optimal lookup table LUTM.

The timing controller 100 may receive the input image signal I_RGB having the lower gray level. During the first to sixth periods CP1-2 to CP6-2, a bias voltage Vbias-2 may be different from each other. For example, the voltage level of the bias voltage Vbias-2 during the first period CP1-2 may be different from the voltage level of the bias voltage Vbias-2 during the second period CP2-2. The timing controller 100 may control the voltage level of the bias voltage Vbias-2 depending on the optimal lookup table LUTM.

According to an embodiment of the disclosure, the timing controller 100 may control the bias voltage Vbias-1 when the image having the higher gray level is provided to the display panel DP (see FIG. 1) to be different from the bias voltage Vbias-2 when the image having the lower gray level is provided to the display panel DP (see FIG. 1). The timing controller 100 may control the voltage levels of the bias voltages Vbias-1 and Vbias-2 to be different from each other by applying the optimal lookup table LUTM (see FIG. 6A) determined or selected depending on gray levels, to the bias voltages Vbias-1 and Vbias-2. Accordingly, the flicker phenomenon caused at each gray level may not be recognized to the user. Accordingly, the display device DD (see FIG. 1) improved in display quality may be provided.

As described above, in an embodiment of the disclosure, the timing controller may calculate the plurality of representative gray levels corresponding to the plurality regions obtained by dividing the display region into the plurality of regions, based on the input image signal. The timing controller may select the optimum lookup table from among the plurality of lookup tables, based on the plurality of representative gray levels. The pulse width of the emission signal may be controlled based on the optimal lookup table. In other words, the pulse width of the optimum emission signal may be controlled based on the input image signal. For example, when the input image signal includes an image mainly having the lower gray level, the optimal lookup table having the pulse width of the emission signal in which the flicker phenomenon is not recognized at a lower gray level. Accordingly, the display device improved in display quality may be provided.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. An electronic device comprising:

a display device comprising:

a display panel driven in units of frames, and including a plurality of pixels in a display region defined therein, wherein the plurality of pixels emits light based on an emission signal; and a timing controller which receives an image signal and drives the display panel, wherein the timing controller includes:

a gray level setting circuit which calculates a plurality of representative gray levels by dividing the display region into a plurality of regions, based on the image signal;

a signal determining circuit which receives a plurality of lookup tables storing a duty ratio of the emission signal and selects one of the plurality of lookup tables based on a lookup table comparison histogram, wherein the lookup table comparison histogram is generated based on the plurality of lookup tables and the plurality of representative gray levels; and a correcting circuit which controls the duty ratio of the emission signal provided during a frame, based on the one of the plurality of lookup tables.

2. The electronic device of claim 1, wherein the frame includes:

a first period and a second period subsequent to the first period, and wherein a first pulse width of the emission signal during the first period is different from a second pulse width of the emission signal during the second period.

3. The electronic device of claim 1, wherein the gray level setting circuit generates a gray level signal through gamma conversion on the image signal.

4. The electronic device of claim 3, wherein the gray level setting circuit calculates the plurality of representative gray levels by averaging the gray level signal with respect to the plurality of regions.

5. The electronic device of claim 1, wherein the signal determining circuit calculates a first histogram obtained by counting and classifying the plurality of representative gray levels depending on a grayscale range.

6. The electronic device of claim 5, wherein the signal determining circuit receives a plurality of gray level weights varying depending on the grayscale range and further calculates a second histogram based on the gray level weights and the first histogram.

7. The electronic device of claim 6, wherein the one of the plurality of lookup tables is a lookup table, which has a maximum value, among the plurality of lookup tables, based on a result obtained by performing a computation operation with respect to the second histogram and each of the plurality of lookup tables.

8. The electronic device of claim 1, wherein the timing controller drives one of the units of the frames of the display panel at a first driving frequency, and drives another of the units of the frames of the display panel at a second driving frequency different from the first driving frequency.

9. The electronic device of claim 1, wherein each of the plurality of pixels includes:

a light emitting element and a pixel driving circuit connected to the light emitting element, wherein the pixel driving circuit includes:

a first transistor;

a second transistor connected to receive a data signal; and a third transistor electrically connected to the first transistor and including a gate electrode connected to receive the emission signal.

10. The electronic device of claim 9, wherein the pixel driving circuit further includes:

a fourth transistor including a gate electrode connected to receive a first scan signal, and wherein the timing controller adjusts the first scan signal based on the plurality of lookup tables.

11. The electronic device of claim 10, wherein the frame includes a first period and a second period subsequent to the first period, and wherein a first pulse width of the first scan signal during the first period is different from a second pulse width of the first scan signal during the second period.

12. The electronic device of claim 9, wherein the pixel driving circuit further includes:

a fifth transistor including a gate electrode connected to receive a bias voltage, and wherein the timing controller adjusts a waveform of the bias voltage based on the plurality of lookup tables.

13. The electronic device of claim 12, wherein the frame includes:

a first period and a second period subsequent to the first period, and wherein a voltage level of the bias voltage during the first period is different from a voltage level of the bias voltage during the second period.

14. A timing controller for driving a display panel in units of frames, wherein the timing controller receives an image signal and the display panel includes a pixel in a display region defined therein to receive an emission signal, the timing controller comprising:

a gray level setting circuit which calculates a plurality of representative gray levels by dividing the display region into a plurality of regions, based on the image signal;

a signal determining circuit which receives a plurality of lookup tables storing a duty ratio of the emission signal and selects one of the plurality of lookup tables based on a lookup table comparison histogram, wherein the lookup table comparison histogram is generated based on the plurality of lookup tables and the plurality of representative gray levels; and a correcting circuit which controls the duty ratio of the emission signal, based on the one of the plurality of lookup tables.

15. The timing controller of claim 14, wherein the gray level setting circuit generates a gray level signal by performing gamma conversion on the image signal.

16. The timing controller of claim 15, wherein the gray level setting circuit calculates the plurality of representative gray levels by averaging the gray level signal with respect to the plurality of regions.

17. The timing controller of claim 14, wherein the signal determining circuit calculates a first histogram obtained by counting the plurality of regions depending on a grayscale range, based on the plurality of representative gray levels.

18. The timing controller of claim 17, wherein the signal determining circuit receives a plurality of gray level weights varying depending on the grayscale range and further calculates a second histogram based on the gray level weights and the first histogram.

19. The timing controller of claim 18, wherein the one of the plurality of lookup tables is a lookup table, which has a maximum value among values obtained by performing a computation operation with respect to the second histogram and each of the plurality of lookup tables.

20. The timing controller of claim 19, wherein one of the units of the frames is driven at a first driving frequency, and another of the units of the frames is driven at a second driving frequency different from the first driving frequency.

* * * * *